US008554602B1

(12) United States Patent  
Zohar et al.

(10) Patent No.: US 8,554,602 B1
(45) Date of Patent: Oct. 8, 2013

(54) SYSTEM AND METHOD FOR BEHAVIORAL SEGMENT OPTIMIZATION BASED ON DATA EXCHANGE

(75) Inventors: Meir Zohar, New Milford, NJ (US); Nitzan Ben-Zvi, Kfar Hogla (IL)

(73) Assignee: Exelate, Inc., New York, NY (US)

( * ) Notice: Subject to any disclaimer, the term of this patent is extended or adjusted under 35 U.S.C. 154(b) by 408 days.

(21) Appl. No.: 12/761,779

(22) Filed: Apr. 16, 2010

Related U.S. Application Data

(60) Provisional application No. 61/169,966, filed on Apr. 16, 2009.

(51) Int. Cl.
*G06Q 30/00* (2012.01)

(52) U.S. Cl.
USPC ........................................ 705/7.33

(58) Field of Classification Search
USPC ........................................ 705/7, 14
See application file for complete search history.

(56) References Cited

U.S. PATENT DOCUMENTS

| | | | |
|---|---|---|---|
| 5,848,396 A * | 12/1998 | Gerace | 705/7.33 |
| 5,948,061 A | 9/1999 | Merriman et al. | |
| 5,991,735 A | 11/1999 | Gerace | |
| 6,026,368 A | 2/2000 | Brown et al. | |
| 6,134,532 A | 10/2000 | Lazarus et al. | |
| 6,594,691 B1 | 7/2003 | McCollum et al. | |
| 6,662,215 B1 * | 12/2003 | Moskowitz et al. | 709/217 |
| 6,925,440 B1 | 8/2005 | Shkedi | |
| 6,973,436 B1 | 12/2005 | Shkedi | |
| 6,983,379 B1 | 1/2006 | Spalink et al. | |
| 7,039,599 B2 | 5/2006 | Merriman et al. | |
| 7,062,510 B1 | 6/2006 | Eldering | |
| 7,072,853 B2 | 7/2006 | Shkedi | |
| 7,089,195 B2 | 8/2006 | Rosenberg | |
| 7,162,522 B2 | 1/2007 | Adar et al. | |
| 7,428,493 B2 | 9/2008 | Shkedi | |
| 7,454,364 B2 | 11/2008 | Shkedi | |
| 7,496,943 B1 | 2/2009 | Goldberg et al. | |
| 7,533,012 B2 | 5/2009 | Walsh et al. | |
| 7,617,122 B2 | 11/2009 | Kumar et al. | |
| 7,991,800 B2 * | 8/2011 | Lawrence et al. | 707/803 |

(Continued)

OTHER PUBLICATIONS

"Nielsen Bridges Online and Offline Behaviors with Innovative Cross-Platform Offering," The Nielsen Company, 2012, Retrieved from the internet: Aug. 14, 2012, pp. 1-2.

(Continued)

*Primary Examiner* — John G Weiss
*Assistant Examiner* — Christopher Stroud
(74) *Attorney, Agent, or Firm* — Venable LLP; Jeffri A. Kaminski; Christopher B. Tokarczyk

(57) ABSTRACT

System and method for automatic definition and tuning of user segment combinations used for targeted advertisement and marketing. Automated analysis and feedback modules may provide, ad hoc, optimized market segments definitions that maximize the conversion ratio for advertisements. The system and method may optimize of segment data based on a learning-running process built around a data exchange within a real-time bidding (RTB) media exchange system. In identifying qualified combinations for segments on-going loops or iterations may analyze the correlation between the performance of an advertisement or "creative" and user data, based on a set of parameters. As a part of data segmentation, embodiments of the present invention find combinations of parameters that may predict lift. Segment combinations are optimized by, for example combining a segment combination with one or more other segment combinations and/or dividing a segment combination into two or more different combinations.

12 Claims, 15 Drawing Sheets

(56) References Cited

U.S. PATENT DOCUMENTS

| | | | |
|---|---|---|---|
| 8,019,777 B2 | 9/2011 | Hauser | |
| 8,024,323 B1* | 9/2011 | Nayfeh | 707/715 |
| 8,027,879 B2* | 9/2011 | Ramer et al. | 705/26.3 |
| 8,073,738 B2* | 12/2011 | Protheroe et al. | 705/14.69 |
| 8,108,245 B1 | 1/2012 | Hosea et al. | |
| 8,234,166 B2* | 7/2012 | Filice et al. | 705/14.6 |
| 2002/0166258 A1 | 11/2002 | Posa | |
| 2003/0014304 A1 | 1/2003 | Calvert et al. | |
| 2003/0033196 A1 | 2/2003 | Tomlin | |
| 2003/0036949 A1 | 2/2003 | Kaddeche et al. | |
| 2003/0088485 A1 | 5/2003 | Feinberg | |
| 2003/0135460 A1 | 7/2003 | Talegon | |
| 2003/0167212 A1 | 9/2003 | Monteverde | |
| 2004/0003036 A1 | 1/2004 | Eagle et al. | |
| 2004/0015397 A1 | 1/2004 | Barry et al. | |
| 2004/0024632 A1 | 2/2004 | Perry | |
| 2004/0117486 A1 | 6/2004 | Bourne et al. | |
| 2004/0199397 A1 | 10/2004 | Dresden | |
| 2005/0165643 A1* | 7/2005 | Wilson et al. | 705/14 |
| 2005/0166233 A1 | 7/2005 | Beyda et al. | |
| 2005/0187818 A1 | 8/2005 | Zito et al. | |
| 2005/0193020 A1 | 9/2005 | Shkedi | |
| 2005/0222901 A1 | 10/2005 | Agarwal et al. | |
| 2005/0235030 A1 | 10/2005 | Lauckhart et al. | |
| 2005/0246736 A1 | 11/2005 | Beyda et al. | |
| 2006/0026061 A1 | 2/2006 | Collins | |
| 2006/0041562 A1 | 2/2006 | Paczkowski et al. | |
| 2006/0059042 A1 | 3/2006 | Zohar | |
| 2006/0212349 A1 | 9/2006 | Brady | |
| 2006/0212350 A1 | 9/2006 | Ellis et al. | |
| 2006/0242267 A1 | 10/2006 | Grossman | |
| 2006/0282328 A1 | 12/2006 | Gerace et al. | |
| 2007/0022009 A1 | 1/2007 | Cataldi et al. | |
| 2007/0061195 A1 | 3/2007 | Liu et al. | |
| 2007/0067215 A1 | 3/2007 | Agarwal et al. | |
| 2007/0088609 A1 | 4/2007 | Reller et al. | |
| 2007/0168506 A1 | 7/2007 | Douglas et al. | |
| 2007/0294401 A1 | 12/2007 | Shkedi | |
| 2008/0010155 A1 | 1/2008 | Shkedi | |
| 2008/0183561 A1 | 7/2008 | Zohar et al. | |
| 2008/0195462 A1 | 8/2008 | Magdon-Ismail et al. | |
| 2008/0209037 A1 | 8/2008 | Zernik et al. | |
| 2008/0243531 A1 | 10/2008 | Hyder et al. | |
| 2008/0243592 A1 | 10/2008 | Song et al. | |
| 2008/0263627 A1 | 10/2008 | Berteau et al. | |
| 2009/0006363 A1 | 1/2009 | Canny et al. | |
| 2009/0024546 A1 | 1/2009 | Ficcaglia et al. | |
| 2009/0055332 A1 | 2/2009 | Lee | |
| 2009/0063250 A1* | 3/2009 | Burgess et al. | 705/10 |
| 2009/0063268 A1* | 3/2009 | Burgess et al. | 705/14 |
| 2009/0106296 A1 | 4/2009 | Sickmiller et al. | |
| 2009/0125398 A1 | 5/2009 | Cochran et al. | |
| 2009/0150126 A1 | 6/2009 | Sellamanickam et al. | |
| 2010/0082507 A1 | 4/2010 | Ganapathi et al. | |
| 2010/0082808 A1 | 4/2010 | Vaynblat et al. | |
| 2010/0088177 A1* | 4/2010 | Lu et al. | 705/14.43 |
| 2010/0100415 A1 | 4/2010 | Plummer et al. | |
| 2010/0179855 A1 | 7/2010 | Chen et al. | |
| 2010/0228595 A1* | 9/2010 | Dempster et al. | 705/10 |
| 2010/0332426 A1 | 12/2010 | Van Bemmel | |
| 2011/0125587 A1 | 5/2011 | Netzer et al. | |
| 2011/0131099 A1 | 6/2011 | Shields et al. | |
| 2011/0166927 A1 | 7/2011 | Bandi et al. | |
| 2011/0173063 A1 | 7/2011 | Bhatia et al. | |
| 2011/0173071 A1 | 7/2011 | Meyer et al. | |
| 2011/0187717 A1 | 8/2011 | Jagannath et al. | |
| 2011/0191169 A1 | 8/2011 | Cui et al. | |
| 2011/0191170 A1 | 8/2011 | Zhang et al. | |
| 2011/0191191 A1 | 8/2011 | Bax et al. | |
| 2011/0208591 A1 | 8/2011 | Chen et al. | |
| 2011/0218866 A1 | 9/2011 | Wilson | |
| 2011/0231242 A1 | 9/2011 | Dilling et al. | |
| 2011/0231244 A1 | 9/2011 | Bhatia et al. | |
| 2011/0231245 A1 | 9/2011 | Bhatia et al. | |
| 2011/0231246 A1 | 9/2011 | Bhatia et al. | |
| 2011/0231253 A1 | 9/2011 | Crawford et al. | |
| 2011/0238468 A1 | 9/2011 | Shen et al. | |
| 2011/0246285 A1 | 10/2011 | Ratnaparkhi et al. | |
| 2011/0258052 A1 | 10/2011 | Kakade et al. | |
| 2011/0258054 A1 | 10/2011 | Pandey et al. | |
| 2011/0270670 A1 | 11/2011 | Leathern | |
| 2011/0270686 A1 | 11/2011 | Patwa et al. | |
| 2011/0276391 A1 | 11/2011 | Hillard et al. | |
| 2011/0282732 A1 | 11/2011 | Bax et al. | |
| 2011/0282815 A1 | 11/2011 | Thomas | |
| 2011/0310891 A1 | 12/2011 | Howe et al. | |
| 2012/0004979 A1 | 1/2012 | Bhatia et al. | |
| 2012/0004980 A1 | 1/2012 | Bhatia et al. | |
| 2012/0004981 A1 | 1/2012 | Bhatia et al. | |
| 2012/0010942 A1 | 1/2012 | Bax et al. | |
| 2012/0022952 A1 | 1/2012 | Cetin et al. | |
| 2012/0023043 A1 | 1/2012 | Cetin et al. | |
| 2012/0036007 A1 | 2/2012 | Robertson et al. | |
| 2012/0036008 A1 | 2/2012 | Robertson et al. | |
| 2012/0066072 A1 | 3/2012 | Kanigsberg et al. | |
| 2012/0078705 A1 | 3/2012 | Megdal | |
| 2012/0078709 A1 | 3/2012 | Dunham et al. | |
| 2012/0078711 A1 | 3/2012 | Mehta et al. | |
| 2012/0084149 A1 | 4/2012 | Gaudiano et al. | |
| 2012/0095845 A1 | 4/2012 | Shani | |
| 2012/0095848 A1 | 4/2012 | Chan | |
| 2012/0095985 A1 | 4/2012 | Shen et al. | |
| 2012/0109745 A1 | 5/2012 | Bhamidipati | |
| 2012/0116885 A1 | 5/2012 | Krishnamoorthy | |
| 2012/0123851 A1 | 5/2012 | Bax et al. | |
| 2012/0123859 A1 | 5/2012 | Gupta | |
| 2012/0123863 A1 | 5/2012 | Kaul et al. | |
| 2012/0150641 A1 | 6/2012 | Dobbs et al. | |
| 2012/0166272 A1 | 6/2012 | Wiley et al. | |
| 2012/0173326 A1 | 7/2012 | Tao et al. | |
| 2012/0191528 A1 | 7/2012 | Bax et al. | |
| 2012/0203642 A1 | 8/2012 | Park et al. | |
| 2012/0253928 A1 | 10/2012 | Jackson et al. | |
| 2012/0278158 A1 | 11/2012 | Farahat | |
| 2012/0290403 A1 | 11/2012 | Galitzky et al. | |

OTHER PUBLICATIONS

"Online Advertising," Fresh Patents.com, Retrieved from the internet: Nov. 20, 2012, pp. 1-2, http://tgs.freshpatents.com/Online-Advertising-bx1.phphttp://tgs.freshpatents.com/Online-Advertising-bx1.php , retrieved on Nov. 20, 2012.

LaRue, "eXelate, Nielsen Catalina Solutions Partner to Bring CPG Data Online," Adotas, Jan. 31, 2012, Retrieved from the internet: Aug. 14, 2012, pp. 1-2.

Lykou et al., "Sparse CCA using a Lasso with positivity constraints," Computational Statistics and Data Analysis, 2010 vol. 54, pp. 3144-3157.

Soltani et al., "Flash Cookies and Privacy," 2009, Summer Undergraduate Program in Engineering Research at Berkeley (SUPERB), pp. 158-163.

Stage et al., "Measuring Similarity in Nearest Neighbor Imputation: Some New Alternatives," Proceedings of the Symposium on Statistics and Information technology in Forestry, 2003, pp. 1-6.

Witten et al., "A penalized matrix decomposition, with applications to sparse principal components and canonical correlation analysis," Biostatistics, 2009, vol. 10, No. 3, pp. 515-534.

* cited by examiner

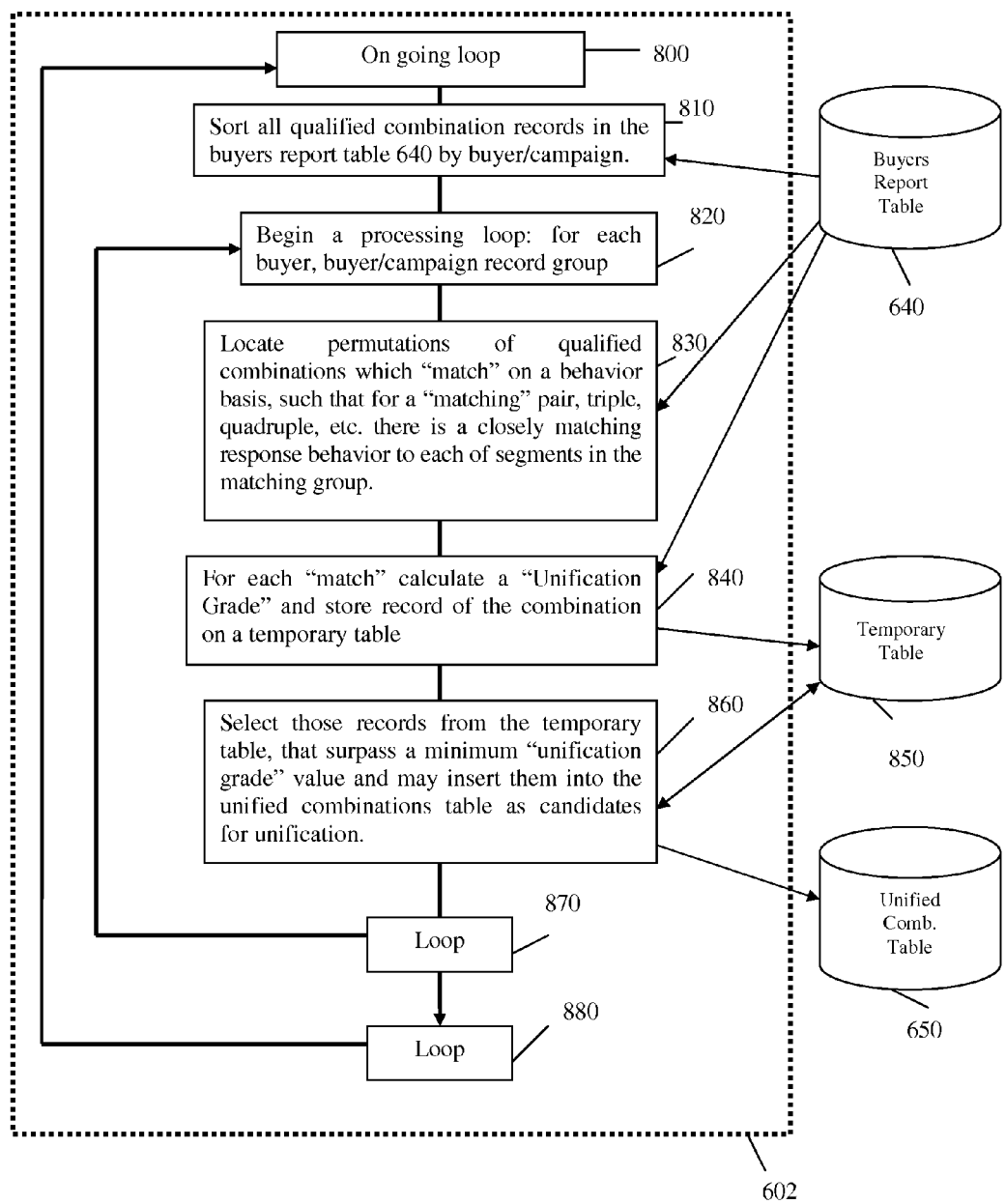

SYSTEM AND METHOD FOR BEHAVIORAL SEGMENT OPTIMIZATION BASED ON DATA EXCHANGE

CROSS REFERENCE TO RELATED APPLICATION

This application claims the benefit of U.S. Provisional Ser. No. 61/169,966, filed on Apr. 16, 2009 (and titled "BEHAVIORAL SEGMENT OPTIMIZATION BASED ON A DATA EXCHANGE") which is incorporated in its entirety herein by reference.

FIELD OF THE INVENTION

This invention relates to the fields of targeted marketing, targeting advertisement content, automatic segment enhancement for advertising and marketing, and advertising through targeted marketing on the World Wide Web using market segment data.

BACKGROUND OF THE INVENTION

Targeting and data collection techniques provide advertisers and other marketing organizations with market segment data related to advertising viewers, including, for example, computer users who view advertising on the World Wide Web (Web) or Internet. For advertising viewers such as Internet users, the available information related to each user depends, for example, on his or her historical Web behavior and, for example, on his or her origin environment, such as the user's computing platform, service provider, country, time of day, etc. A "market segment" or "segment" is a subset, or partial portion of a group that can be characterized in some way; a segment may also be a data object describing such a group.

Advertisers and other marketing organizations may create segment definitions to define groups of potential marketing targets (e.g., users) and direct advertising to those groups, such as groups of users on the Internet. "Data publishers" (or "data sellers") may sell information concerning targets or people, such as Internet users, and their behaviors, which advertisers and other marketing organizations may use to create, for example, behavioral segment definitions. An Internet user may access a Web site of a data publisher, such as a bicycling interest Web site, for example, and be identified as a user "interested in bicycling". Other attributes, such as time and location of the person's access, may also be identified. Data publishers may sell the identifying information about users who access their sites and receive income from sales based on this information's use.

User identification (ID) data from data publishers can be used to create segment definitions. In general, segment definitions may be characterized by specific values for available properties. For example, segment definitions might exist for categories such as "Gender", "Age" and "Nationality" and one segment combination might be defined with three properties as, "Male, 35-40, European." Once identified (e.g., from information from a data publisher (data seller)), a user who fits the characteristics of "Male, 35-40, European" can be grouped into and/or associated with this segment combination. An advertisement can be exposed to (or placed) with users identified with the segment combination, and data can be collected to determine how the users identified with that segment respond. Behavioral segment definitions for "Shopping Interest", "Running Interest" and "Web surfing interest" can be defined and Behavioral attributes, such as "likes to shop", "intensely likes running" or "Web surfs in the evening" can also be included in segment combinations. Segment combinations can have attributes that are purely behavioral, purely non-behavioral or a mixture of behavioral and non-behavioral.

The efficiency of a given advertisement depends on the match between the content of the advertisement (advertising content) and the market segment to which the content is exposed. In practice, a numeric "conversion ratio" value describes the efficiency or "success" relationship between the advertising content and target segment. A high conversion ratio value can show, for example, by various measures or various methods of determining or collecting such data, that a given advertisement or advertising campaign (group of advertisements) is well received by a given target segment.

It is perceived within the advertising and marketing industries that, in general, better and more accurate segment targeting capabilities could improve conversion ratios. High conversion ratios for advertisements, on the Internet and in other advertising venues, such as, e.g., print, outdoor, direct are desirable. Identification, for example, of a large user group with a high response rate to advertising and with members who respond in stable and predictable manners over time is desirable.

Within Internet marketing, serving systems for organizations executing advertisement placement in advertising campaigns may execute "media optimization" when placing an advertisement on a particular Web site or with a particular media publisher. Media optimization may include analyzing parameters in segment combinations to identify values for each parameter that may yield the "best results" for each advertisement the serving system runs. A serving system may be a networked computing system that enables an operator to place advertisements on particular Web pages. Serving systems place advertisements on behalf of an advertiser or advertising agency, and can be operated by a number of entities such as an independent operator working with an advertiser or advertising agency.

With the development of the Internet advertisement market, it is thought that bid based media purchasing may become more widely used. In such a system "real time bidding" (RTB) bidders acquire spaces from media publishers on a "real time bidding" (RTB) exchange. An RTB bidder in such a model could operate one or more serving systems. More accurate and efficient segmentation or grouping capabilities can provide an advantage to the bidders and allow them to more greatly maximize their profit in this arena. In such a bidding environment, response time becomes a critical element and it is perceived that automatic tools, including those with segment-identifying capabilities may improve operational efficiency.

Serving systems using available media optimization algorithms have distinct limitations. Automatic systems exist, but with such systems, segment content does not get improved with the time. Such systems, generally, use "raw" segment data as received from a data publisher (data seller). An algorithm for media optimization looking at such data can, for example, identify that a given creative works well (e.g. gets a high conversion ratio) when displayed to users on weekends. Based on that high weekend response, a media optimization using such live user data may show that the creative in question should be used mostly on weekends. This type of algorithm ignores past data, however, so, for example, the algorithm may not identify the fact that the campaign related to the creative works better for people who expressed an interest in technology gadgets within the last 30 days. Such an algorithm, for example, also does not allow for improvements as more data is amassed.

Another drawback in current systems is that such systems provide only limited centralization. A centralized system may, for example, allow handling of different data types, such as the different types of data provided by different types of data publishers ("data sellers"). Using behavioral aspects from a wide group of data publishers may provide an advantage in manipulating a wide variety of data and could enhance segment groupings. Such a centralized system, may also, when accessed by "data buyers", further be able to improve the segment data over time and provide it in a manner that permits further automation of data buyer and data seller systems. Such automation may desirable for system such as an RTB media exchange system.

In general, there is a need for improved techniques for media optimization, in the advertising and marketing fields in general and, in particular, with regard to Internet advertising.

SUMMARY OF THE INVENTION

Embodiments of the present invention provide a system and method for automatic definition and tuning of user behavioral segments, by, for example, combining segment combinations, dividing or splitting segment combinations or otherwise altering segment combinations. In this description, a segment may be a data structure, e.g. stored on a computer, which holds attributes or parameters used to characterize groups of people, e.g. a sub-set or portion of a larger group, and which may link statistical and other information about the groups' members, such as, for example, how many members (e.g. the percentage of users) belonging to this group. A segment definition may be a data structure, e.g. on a computer, which sets attributes and parameters (or sub-segments) that identify the nature, properties or meanings of the segment (for example, "frequency of reading news", "Origin country", "gender"). Segments, based on the segment definitions, can be combined together into data structures, e.g. on a computer, called segment combinations. A "segment combination" holds attributes and parameters that identify behaviors for more than one segment. For example a segment for people who "read news every 3 hours or more" and a segment for people who "like fictional books" can be combined into a segment "combination" (The relation in combination can be "and" or "or"). Segment combinations can also be referred to herein as segments.

Embodiments of the present invention utilize automated analysis and feedback modules to provide optimized market segments designed to maximize conversion ratios for provided advertisement content. Within the definition and tuning of user segments as described herein, embodiments of the present invention provide for behavioral segment combination optimization based on, for example, a data exchange, or other methods. In this description, a "behavioral segment" may be a segment definition (herein a data structure, implemented on a computer), having definitional attributes that pertain to subjective aspects of people's behavior such as for example, "tendency to read news", "common working hours". When comparing such aspects to other aspects such as "age" or "origin country" or "gender" Behavioral segments can be combined into further data structures on a computer with either non-behavioral segments or other behavioral segments to form "behavioral segment combinations".

One embodiment may operate through an exchange system in connection with a serving system of an organization that places advertisements, such as an advertiser, an advertising agency or, in the example of Internet bid-based media placement, a real-time bidding (RTB) organization (an "RTB bidder") within a real-time bidding (RTB) media exchange system. Such an embodiment provides a configuration where pluralities of serving systems, for example those of RTB bidders, use, for segment optimization, a centralized exchange system also connected to or associated with systems of one or more data publishers (data sellers). The centric setup may bring together "data buyers" on the one hand, such as serving systems who execute advertisement placement (e.g. an RTB bidder system) and "data sellers" on the other hand, such as data publishers who user identification data that can be associated with particular behavioral segments. Optimizing of segments according to some embodiments can be used outside of an RTB media exchange system and does not need to be used with a system including data buyers, data sellers, or with the specific architectures disclosed herein.

Embodiments of the present invention may further allow optimized segment combinations to be made available to a serving system organization (such as an RTB bidder) for their use in making advertising placement determinations (e.g. automatically through the serving system's existing placement engines). An operator of a serving system of an RTB bidder, for example, may request optimization services, as a client, from an embodiment of the exchange system. The exchange system may "tag" users (e.g. with a "buyers tag"), identifying them through "cookies" (e.g., located on the user's computers) with segment identifications naming the client. Other methods and systems for identifying users with segments may be used. "Tagging" may be accomplished by writing, saving, or otherwise storing an identifier of the new segment combination, using a computer server connected to the network, on computers of a plurality of new computer users at the time each new computer user access a Web site of a data publisher to identify the computers of the new computer users with the new combination. Such a tagging process occurs, for example, when a user accesses a Web site of a "data seller" such as a data publisher. The serving system client, then may be able to expose an advertisement (e.g. in its test runs of an advertisement) to groups of users who can be identified to these exchange system-provided segments.

Data concerning the user's responses to the advertisement can be collected for users identified with these segments. In one embodiment, the serving system may collect the user response data and provide summary reports to the exchange system. In another embodiment, the serving system may arrange for all user requests to be routed through exchange system, and in such an embodiment, the exchange would receive the user responses "live" and in real time. In one embodiment, the exchange system may receive responses from many clients (e.g. many advertising placement organizations) concerning the segments.

The exchange system may tune or update the segment definitions through an optimization process, based on the user response data received. In one embodiment, the exchange system may modify or change the segment definitions. The exchange system may, for example, combine two or more segment combinations, or divide a segment combination into two or more other segment combinations. Such embodiments may provide systems and methods for improving segment combinations, where each segment combination may comprise information characterizing behaviors by individuals identifiable to specific computers in a computer network.

The optimized segment combinations may then be output by the exchange system, in an automated fashion to identify or "tag" users for the RTB bidder (the client), and for other clients as well, where users are now associated with one or more of the optimized segment definitions. The serving engines within the serving system (e.g. of an RTB bidder) may then execute "media optimization" and target the advertisement to large numbers of users identified with the optimized segment combinations. The process can continue and data from further runs of the advertisement may be used to further optimize segment combinations. Data from many advertisements may be used to optimize segment combinations. Embodiments may perform optimization on data from many clients and many advertisements (or many kinds of advertisements). Optionally, other data configurations such as optimization on the data of individual clients (on their own specific data) are possible.

One goal of optimized targeting may be to achieve an increase in conversion ratios for an advertisement or advertising campaign. A tuned or optimized segment combination may identify a group of users that behaves predictably to advertising. When large, predictable groups are identified, such as when many segment combinations are combined, such segments identifications may be valuable to data "buyers" such as an RTB bidder. Use of user data in large combined segments may be also profitable to data "sellers". Embodiments of the exchange system bring together such groups and further provide optimization that may enable further automation of data seller and data buyer processes.

Embodiments may perform segment optimization using a number of processing threads or other computer-based processes that examine data, for example, in on-going loop processes that may be updated periodically. A first thread (e.g. a "Thread I") may perform an analysis for a given advertisement on the user response data (such as data in a buyer report table) received for that advertisement to identify or "tag" certain segment combinations for further processing in the combine/divide/alter process. When user data shows that a given segment combination has a achieved a "good" or high response level, for example, that segment combination may be tagged as an "approved" or "qualified" combination. A second thread (e.g. a "Thread II") may analyze "qualified" combinations and further combine two or more qualified combinations to create, for example, a "unified combination". A unified combination, for example, may identify or describe a larger population of users who behave similarly in response to advertising. A third thread (e.g. a "Thread III") may compare the unified combination table entries with the current behavioral/combined segment definitions (such as may be located, for example, in a behavioral/combined segments table) and may update the existing segment combinations, such as by adding (or activating) new optimized segment combinations and "de-activating" or (removing from use) segment combinations that do not provide a high response rate.

One embodiment divide and/or alter segment combinations, and may include two additional threads (other methods of dividing and altering segments, not using these threads, may be used). A fourth thread (e.g. a "Thread IV") may analyze user data received (and, for example, stored in a buyer report table) to identify "poor" or low performing segment combinations, tagging them as "candidates" for segment dividing or alteration. Such a thread may also operate to create possible divisions of a segment combination. For example, a segment combination which includes a segment for Age: 20-30 could be possibly split into two segments combinations with different age segments, e.g. 20-24 and 25-30. Thread IV may add or link additional sub segments elements, e.g. 20-24 and 25-30 to the segment combination with age segment 20-30 and then tested user response data against these new "possible" combinations. After a pre-designated period, a fifth thread (e.g. a "Thread V") may perform analysis to determine if it would be desired to split the segment and, if desirable, updates the behavioral segment definitions e.g. adding (or activating) two new divided segment combinations and de-activating (or removing from active use) the original segment combination.

Embodiments, with thread processing and otherwise, provide both systems and methods of improving segment combinations comprising information characterizing behaviors of groups of users of computers in a computer network. Such processing may comprise, for example, receiving, at a computer server, user response data concerning an advertisement exposed to a first plurality of computer users operating computers connected to the computer network, the identities of the computers of the users being identified with a segment combination based on the computers' previous accessing of a data publisher Website, the user response data providing a user response rate value indicative the responsiveness of the users of the computers to the advertisement. Such processing further may comprise identifying from the user response data, those segment combinations within the user response data that have a user response rate surpassing a pre-determined value measured according to one or more user events and also creating at least one segment combination as a new combination from permutations of the identified segment combinations wherein the resulting new combination has an associated value indicative of statistical unification that surpasses a threshold value and provides an indication of the behavioral similarity of the combined group in response to the advertisement.

With a new combination identified, the system then may write, save or store an identifier of the new segment combination, using for example a computer server connected to the network, on computers of a second plurality of computer users at the time each second plurality computer user access a Web site of a data publisher to identify the computers of the second plurality users with the new combination, where the new segment combination is written to the computers to be accessible and identifiable to a serving system of an advertisement placement organization. Other embodiments of combining and dividing segments another statistical data are possible.

In embodiments of the present invention, segments or groups can be output by an exchange system either as "virtual" segments or "real" segments. When outputting the exchange system may, for example, "tag" a user with cookies (e.g., located or saved on the users' computers) or other methods or devices that identify a segment in either a "virtual" or "real" way. In one embodiment when the segments are provided as "virtual" segments, the serving system may receive cookies from a user that, for example, identify a segment by number (e.g. "Exchange System, Segment #5") and provide no further attribute-descriptive or other information. In another embodiment, the serving system may receive the 'real' segments information (e.g. codes or texts) providing an explanation or meaning for the segment. Providing "virtual" segments (e.g. having only identification or limited conversion ratio data only), may facilitate advertising placement through, for example, automated systems, where for example, a serving system, such as a serving system of an RTB bidder, places advertisements based on a "media optimization" process or algorithm without knowing the attribute details of the segment combination. The serving system may rely on the optimization process which seeks to identify user groups who have high response levels and/or who behave reliably.

When the segments are provided as "real" segments, the exchange system may "tag" a user with content that describes the segment attributes (e.g. text or codes that describe behavioral and other preferences—"Male", "25-30", "likes to swim"). That data can be used by, for example, the RTB bidder, if desired for processing. The meaning may be reported a data buyer, e.g. an RTB bidder in other ways, outside of receiving it through a cookie.

Such combining or dividing of segments or other data sets describing users, and providing segments as virtual or real segments need not be used exclusively with the system disclosed herein, including specific entities or specific architectures, and can be use with other entities and architectures.

In addition, embodiments of the exchange system may operate in connection with data publishers (data sellers) in ways that further support their seller-side automation. As data publishers are integrated to the exchange system in embodiments of the present invention, the exchange system may offer better monetization of their data, easy management of multiple serving systems and ability to control access to their data such as through a bidding system connected to the exchange system. In one embodiment, the exchange system provides an auto registration component that is based, for example, on registration and set-up, a qualification phase and then an active run phase. Automated billing may be supported, and in one embodiment of the present invention, the exchange system calculates income due to the data publishers based on the exchange's logged data and pre-set deal terms. Further to the above, the embodiments of the present invention provide a fraud detection component to monitor various angles of the data to identify fraudulent cases and provide warnings or cut-off data sources Embodiments of the present invention may be implemented in both computer hardware and software with the software for execution on computer hardware components. The invention in embodiments is implemented also in a combination of computer hardware and software elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7B depicts an exemplary process flow for the unified combinations procedure, according to an embodiment of the present invention.

Figure 1:
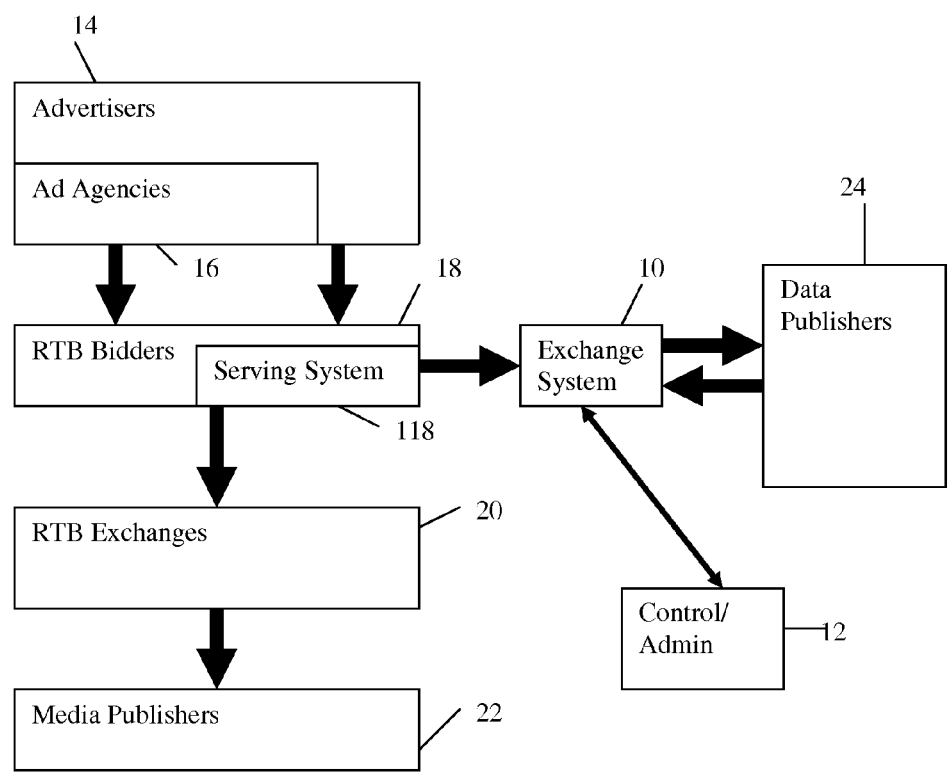
FIG. 1 depicts an embodiment of the present invention implemented as part of a bid-based media purchasing and system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

To assist in further explanation the presented embodiments of the invention, term explanations are provided in the "Explanation of Terms" section at the end of the detailed description.

RTB Media Exchange System

Embodiments of present invention can be implemented as part of a bid-based media purchasing and system, for example as is depicted in FIG. 1. In other embodiments, other systems, including other entities and other hardware, may be used. Such a system may include entities such as advertisers 14, advertising agencies 16, RTB bidders 18, RTB exchanges 20, media publishers 22, and data publishers 24. In one embodiment, an exchange system 10 with an administrative and control interface 12 communicates with one or more RTB bidders 18 and one or more data publishers 24. Other entities, and other hardware devices, may be used. The exchange system 10 interfaces with the data publishers 24 (and users accessing data publisher 24 Websites) to obtain data to create segments (or groups) and tag users with segment or group identifications. The exchange system 10 further provides segment optimization services to RTB bidders 18. An overview of the participants within such an environment follows; other or different parties may participate, and in different manners.

In an exemplary system as depicted in FIG. 1, media publishers 22 sell advertising space to advertisers 14 and their respective advertising agencies 16. Media publishers 22, for example, are organizations having sites on the World Wide Web ("Web sites") that allot Web page space to advertisements. For example, companies such as the New York Times, Games.com or Facebook sell space on their Web pages for creative advertisements such as banner advertisements. Media publishers 22 provide their content to consumer users alongside of advertisements (e.g. banner advertisements) placed in the Web page advertising spaces.

Advertisers 14 can include companies who publish and promote products and/or services. Advertisers 14 promote their products and services though, for example, advertisements on media publisher 22 sites on, e.g., the World Wide Web. As an example, an advertiser 14 may be company such as Ford, American Express, American Airlines or Macy's with a product or service to sell. Advertisers 14 use advertising campaigns and advertisements, such as Web banner advertisements, for product and service promotions. In this process, advertisers 14 work with advertising agencies 16 to develop advertisements and marketing campaigns for their products and services. Advertising agencies 16 represent the advertisers 14 and publish advertisements on behalf of the advertisers 14, for example, on Web sites such as the media publisher 22 Web sites. Advertisers 14 can also work independently from an advertising agency 16 and publish advertisements, for example, on the media publisher 22 Web sites.

In the embodiment of FIG. 1, the advertisers 14 and/or advertising agencies 16 may obtain advertising space of media publishers 22 through a "real time bidding" (RTB) exchange system for selling Web page advertising space. In such an embodiment, RTB bidders 18 are organizations that mediate between advertisers 14 and/or advertising agencies 16 and the RTB Exchange 20 in bid transactions for media publisher 22 advertising spaces. Other methods of obtaining space, other than RTB, may be used, and different entities may exchange information and advertisements. Examples of organizations that may be RTB bidders 18 include, for example, companies such as inviteMedia, MediaMath and Turn. RTB bidders 18 interface with one or more advertisers 14 and/or advertisement agencies 16 concerning specific advertisements and specific marketing campaigns. The RTB exchange 20 represents one or more media publishers 22 in the sale of advertising spaces to advertisers 14, either directly or as represented by advertisement agencies 16, via bid transactions. In such an embodiment, the RTB bidder 18 operates a serving system 26 and uses marketing segments to perform media optimization in placing the creatives or other advertising content it receives from either the advertisers or advertisement agencies. Referring again to FIG. 1, data publishers 24 (data sellers and/or other entities) may collect user access data concerning user's access Web sites or Web pages dedicated to or focused on a specific user interest, such as for example Web sites for "fishing equipment", "chopper" motor cycles, or "minivans". Data publishers 24 sell or market user identification data and other parameter data related to the user's access of these Web sites. The exchange system 10 may use the user identifications and related parameters to define segments and place the users into segment groups.

Embodiments of the present invention may enable RTB bidders 18 to receive tuned or optimized behavioral segments that are automatically updated by the exchange system 10.

Hardware

An exemplary the exchange system 10 may comprise a networked computer system, coupled to and communicating with computer systems of one or more RTB bidders 18. The exchange system 10 may also be coupled to and communicate with computer systems of one or more data publishers 24. The exchange system 10, in one embodiment, is further coupled to and communicates with a control/administration interface 12, which is used to monitor and control the operations of the exchange system 10.

In one embodiment, the exchange system 10 may include a plurality of networked computers making up a server system. A system of networked computers is known in the art and many different types of computers and hardware configurations can be suitable for an embodiment of the exchange system 10. The configuration of computers may depend upon the load of the data moving through the exchange system. In one embodiment the exchange system may be implemented on a standard personal computer or PC, e.g. with an UNIX/Windows-based operating system. Additional networked servers and processors may be used, e.g. depending on the load. The computer configuration, e.g., networked computer system, of the exchange system 10 communicates with the computer systems of the RTB bidders 18 and the data publishers 24 (and users who access the data publisher Websites) via a communication interface such as the Internet or a dedicated interface (for example TCP/IP based). Such a communication configuration may employ a standard HTTP (Hyper Text Transport Protocol) interface which may be used by the data publisher 24 and/or RTB bidder 18 to send or receive data. The standard interface may also be used when the exchange system updates the "cookie information" on a user browser when the user accesses a data publisher site.

The networked computer system 10 may include a database and database management system. Sufficient computer memory may be provided to store and manipulate computer data in generating the segments. For example, a standard dual CPU (or dual core) system with 4 Gigabyte memory may be used for processors in the system. Database storage and manipulation systems for high speed access to data are known and any number of known such systems such as MySQL™, Oracle™, or Microsoft SQL™ server can be used to implement embodiments of the present invention.

Data Exchange Overview

Figure 2:
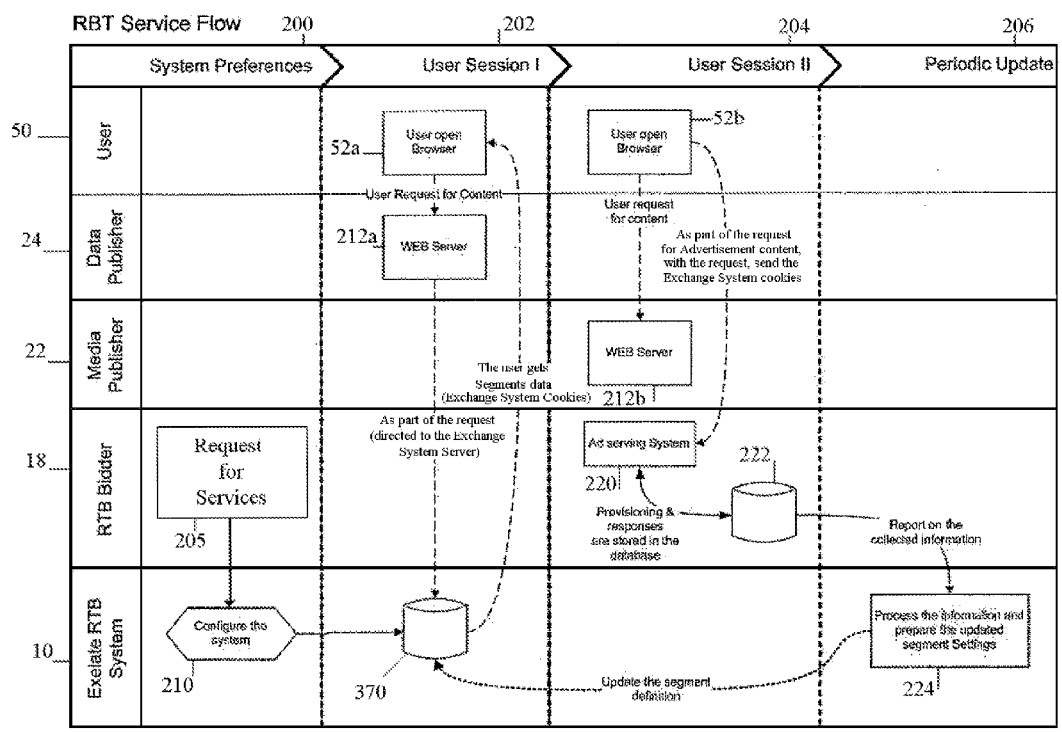
FIG. 2 provides an overview depiction of an exemplary RTB service flow, according to an embodiment of the present invention.

FIG. 2 provides an overview depiction of an exemplary RTB service flow, according to an embodiment of the present invention. The figure shows a number of process phases, with different steps executed or performed by different actors in an RTB media exchange system. In a system preferences/set up phase 200, an RTB bidder 18 may request optimizing services 205 and the exchange system 10 may configure the system resident on the exchange system 10 servers. In this phase the exchange system 10 may perform a data set up for the RTB bidder 18. Such data configurations may be stored on the exchange system servers in a database 370.

Users may access Web content and receive (via the users' computers) and transmit "cookie" data in two exemplary phases: a "User Session I" phase 202 and a "User Session II" phase 204. In the User Session I phase 202 the user may receive "cookies" (e.g., to be located or saved on the user's computers) that a client, such as an RTB bidder 18 can use to identify the user. At step 52a in FIG. 2, a user 50, operating a computer, opens a browser program, e.g. such as Safari™, or Windows Explorer™ or Firefox™ and accesses a site of a data publisher 24, such as a Web site on the World Wide Web (WWW). The action generates a user request for content on the Web server 212a of the data publisher 24. As noted above, data publishers 24 provide users access to Web sites having distinct focuses such as Websites for "bicycling" or "knitting" or "finance". The discernable interests of these sites allow for a user to be identified with the interest. By agreement between the owners of the exchange system 10 and data publisher 24, the user request for content transmitted by the user can be "redirected" to the servers of the exchange system 10.

In one exemplary embodiment, the exchange system 10 upon receiving such a re-direct request will download (e.g. from the database 370) to the browser of the user 50, "cookies" that will associate the user with one or more of the segments maintained the exchange system. The exchange system 10 may, for example, place or save that cookie on the browser of the user in the name of the RTB bidder 18 and show that the cookie is "for" the RTB bidder 18. Thus, the user will carry a cookie "tagged" for the RTB bidders and will identify the user with a particular segment, such as "interested in finance". The information "interested in finance" could be written within the cookies as "real" information (with for example "interested in finance" being spelled out in the "cookie", such that the RTB bidder knows what the identified interest is. In an alternative embodiment, the information "interested in finance" could be provided virtually, such that the cookie only identifies the user with a segment identifier such as "Exchange System Segment #5".

In the User Session II phase 204, the user brings the "cookie" information to the RTB bidder 18. At step 52b the user, again, operating a computer, opens his or her browser program and accesses a Web site. However, unlike the instance in "User Session I" 202, where the user 50 accesses a Website of a data publisher 24, in this case, the user 50 may access a Web site on a Web server 212b of a media publisher with frames dedicated for advertising. In one exemplary embodiment, the user request for content may cause a "re-direct" to occur (for a defined frame 'hosting' advertisement content). Such a re-direct will be directed to an advertisement serving system 220 (e.g. within a serving system 118 of an RTB bidder 18). The re-direct will also "'forward" or transmit to the RTB bidder 18 the user's "cookies" placed by the exchange system 10 on the user's computer. The cookies identify the user with one or more segments of the exchange system. The segment information may be "real" or "virtual".

The serving system 118 of the RTB bidder 18 may use the "cookie" information to target an advertisement to the user. Thereafter, if the user takes an action concerning the presented advertisement, such as by "clicking" on the advertisement to link to a Website pertaining to the advertisement, the Web coding of the advertisement may track the user's action. The information may identify the advertisement and identify the response, as well as other information such as time and location of the action. In FIG. 2 the advertising serving system 220 may store the user responses, compile data and provide reports to the exchange system 10, for example, concerning the performance of the exchange system segments (e.g.—did the users identified with the exchange system segments respond?) Such information may be stored in a memory, e.g., in database 222 of the RTB bidder 18 (e.g. within memory 319) and in database 370 (within memory 307) when received by the exchange system 10 (see FIG. 3). In another embodiment, the exchange system 10 may receive the user responses directly (e.g. through a re-direct configured to route to the exchange system 10). At 224, the exchange system 10 processes the information and performs the optimization process, updating the segment settings of the exchange system 10 by, for example, combining or dividing segment combinations or otherwise altering them. The revised segments may then be used, for example, for tagging users in, e.g. the first user session 202.

Exchange System Elements

Figure 3:
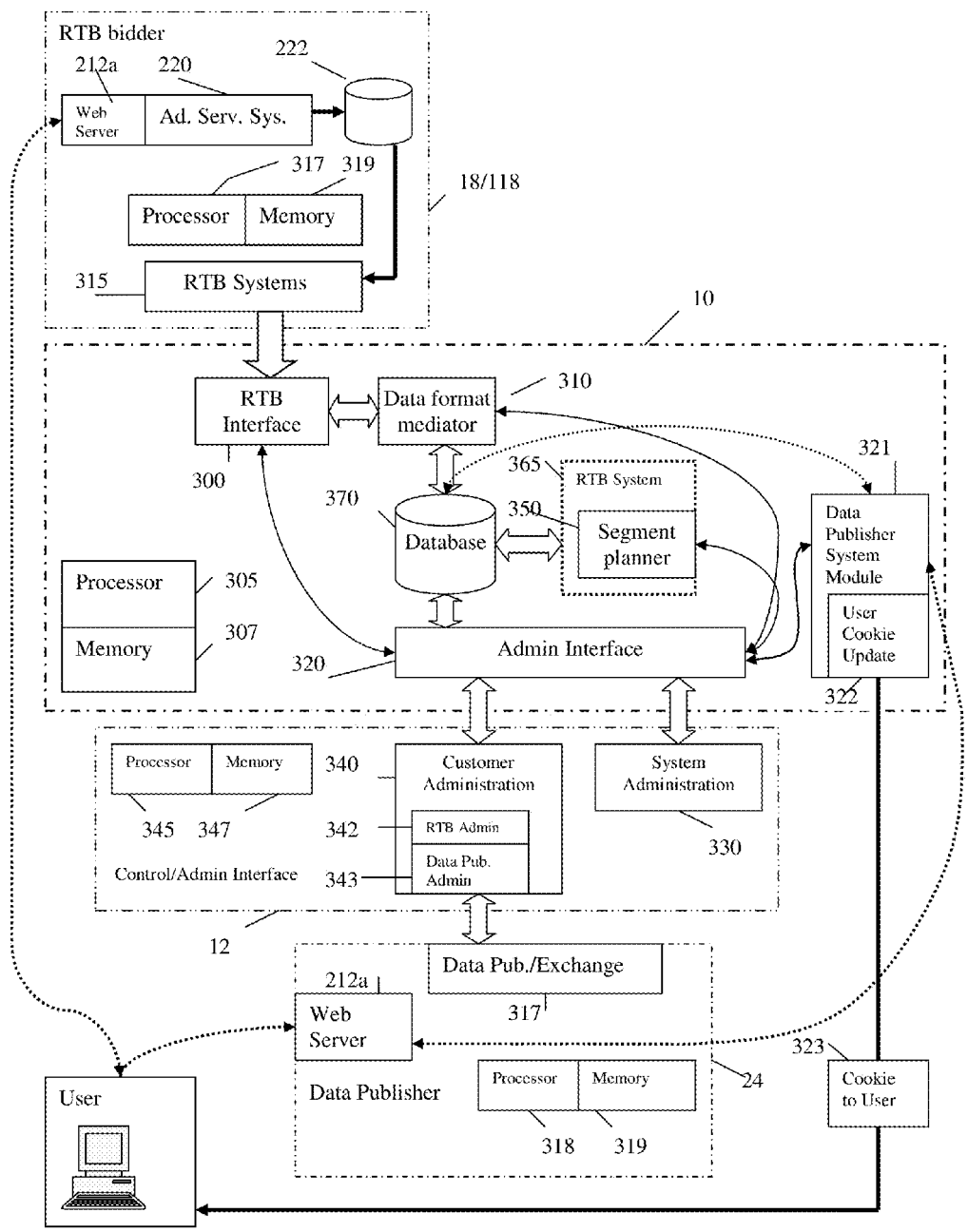
FIG. 3 depicts a set of elements for an embodiment of the exchange system, according to an embodiment of the present invention.

FIG. 3 depicts a set of software and database elements for an embodiment of an exchange system 10 with group or segment-optimizing. Within the exchange system 10, an RTB server interface 300 may be responsible for communication and interface with client systems such as the serving system 118 of the RTB bidder 18. The RTB server interface 300 may allow, for example, the exchange system 10 to receive summary data, such as for example a performance summary of the segment combinations, aggregated, for example, per advertising campaign. On the RTB bidder-side (18), there may be an RTB/Exchange system module 315 (or set of modules) that, for example, transmits data (such as summary user response data) to the exchange system 10. As also shown in FIG. 2, the serving system 118 of an RTB bidder 18 may also operate an advertising serving system 200 which transmits advertisements to users as Web page content and collects user response data, which may be stored in a data base 222. One or more computer processors 317 coupled to one or more computer memories 319 may be used in such an embodiment to execute the RTB/Exchange system modules 315 and other elements, e.g. 118, 220, 222. For example, processor 317 may execute modules for the web server 212b, advertising serving system 200 and RTB system 315. Database 222 as well as the computer code for modules 212b, 200 and 315 may be stored in memory 319. In FIG. 3, the processor 317 and memory 319 are depicted to encompass elements of the serving system 118 as a whole.

An administrative interface module 320 within the exchange system 10 may be responsible, in one embodiment, for the administration aspects, user permission and access, client configuration (e.g., such as configurations with the serving system 118 of the RTB bidder 18), system administration and communication (e.g. with the control/administration interface 12). The control/administration interface 12 may provide in one embodiment, a system administration module 330, for system administration and status monitoring, and a customer administration module 340, for customer configuration and status monitoring. Within (or part of) the customer administration module 340 may be an RTB administration module 342 for performing RTB customer configuration and monitoring. Another module 343 may perform data publisher 24 system configuration and monitoring. To execute the procedures of the control/administration interface 12 in one embodiment, one or more computer processors 345 coupled to one or more computer memories 347 may be used. For example, processor 345 may execute modules for the customer administration 340 (including RTB administration 342 and data publisher administration 343) and system administration 330. Memory 347 may store computer code for modules 330, 340 (including 342 and 343). In FIG. 3, the processor 345 and memory 347 are depicted to encompass elements of the control/administrative interface 12 as a whole.

Within the exchange system 10, a segment planner module 350 processes the collected information (e.g. within the boundaries of a system policy, such as the "tagging policy" described further below) and may create new groups or segments for output. To implement such processing, the segment planner module 350 may operate within, as part of, or in connection with an RTB system module 365 in optimizing segments. The system database 370 may hold, for example, customer-provided information ("buyer" information), data publisher information ("seller" information), segment definitions, segment combinations and segment processing data, and may be accessed by RTB system module 365 and segment planner module 350. In one embodiment, the RTB system module 365 along with the segment planning module 350 may execute processes for analyzing user response data, performing combining, dividing and other alteration of the segments and other aspects of the User Session II 204 and Periodic Update 206 processes, such as those described with reference to FIG. 2. Also within the exchange system 10, a data format mediator module 310, as an optional procedure, may mediate, for example, between customer data formats exchanges and a system (generic) data format which may be used by the exchange system 10, e.g. for formatting and maintaining segment information. In implementing elements of the exchange system 10, one or more computer processors 305 coupled to one or more computer memories 307 may be used in one embodiment. For example, processor 305 may execute modules for the RTB system 365 (including segment planner 350), administrative interface 320, data publisher system module 321, user cookie update 322 and data format mediator 310. Database 370 and the computer coder for modules 310, 320, 321, 322 and 365 (including 350) may be stored in memory 307. In FIG. 3, the processor 305 and memory 307 are depicted to encompass elements of the exchange system 10 as a whole.

For interfacing with user access to the Websites of data publisher server systems, the exchange system 10, in one embodiment, provides a data publisher module 321 and a user cookie update module 322. The data publisher module 321 may for example receive requests (e.g. on redirect) from users who have accessed a data publisher 24 Website. The data publisher module 321 may also access the data base 370 to determine one or more segment identifications for the user commencing the request. The user cookie update module 322, in one embodiment, may set the user's "cookie" information 323, including for example, cookies that contain a segment identifier for an RTB bidder. The data publisher 24 may communicate with users via the web server 212a and with the exchange system 10 via a data publisher/exchange interface 317. FIG. 3 also shows a processor 318 and a memory 319 for the system of the data publisher 24 to execute its computer processing. For example, processor 318 may execute modules for the data publisher/exchange module 317 and web server 212a. Memory 319 may contain the software code for modules 212a and 317. In FIG. 3, the processor 317 and memory 319 are depicted to encompass elements of the computer system of the data publisher 24 as a whole.

The different parts of the exchange system 10 communicate using various known methods, for example using standard LAN/WAN communication techniques and hardware. Inter-communication between the modules may be LAN based; in other embodiments other communications methods and systems may be used. In one embodiment, for example, the communication with customer systems for the data transfer, such as the RTB bidder 18, may be over the Internet (e.g., a WAN). Both the exchange system 10 and system of the RTB bidder 18 may use, for example, TCP/IP-based protocols. The exchange system 10 may also receive information, such as user response data, and communications with an RTB bidder 18 (and data publishers 24) via standard HTTP (Hyper Text Transport Protocol) interfaces. Other communications methods may be used.

The procedures in the exchange system 10 (see, for example, 202, 204 and 206, FIG. 2) may be ongoing processes that analyze the customer's new data (e.g. user response data from the RTB bidder 18) and identify users in new, optimized segment combinations. Due to the amount of data and processing needs presented by those tasks, multiple concurrent modules such as those depicted in FIG. 3 may be used and may be implemented on more than one server, using for example more than one processor 305 and more than one memory 307. Thus, the exchange system 10, presented in one embodiment, may comprise a plurality of severs with which, for example the database 370 and segment-related processes (350, 365) operate.

User Tagging Details

Figure 4A:
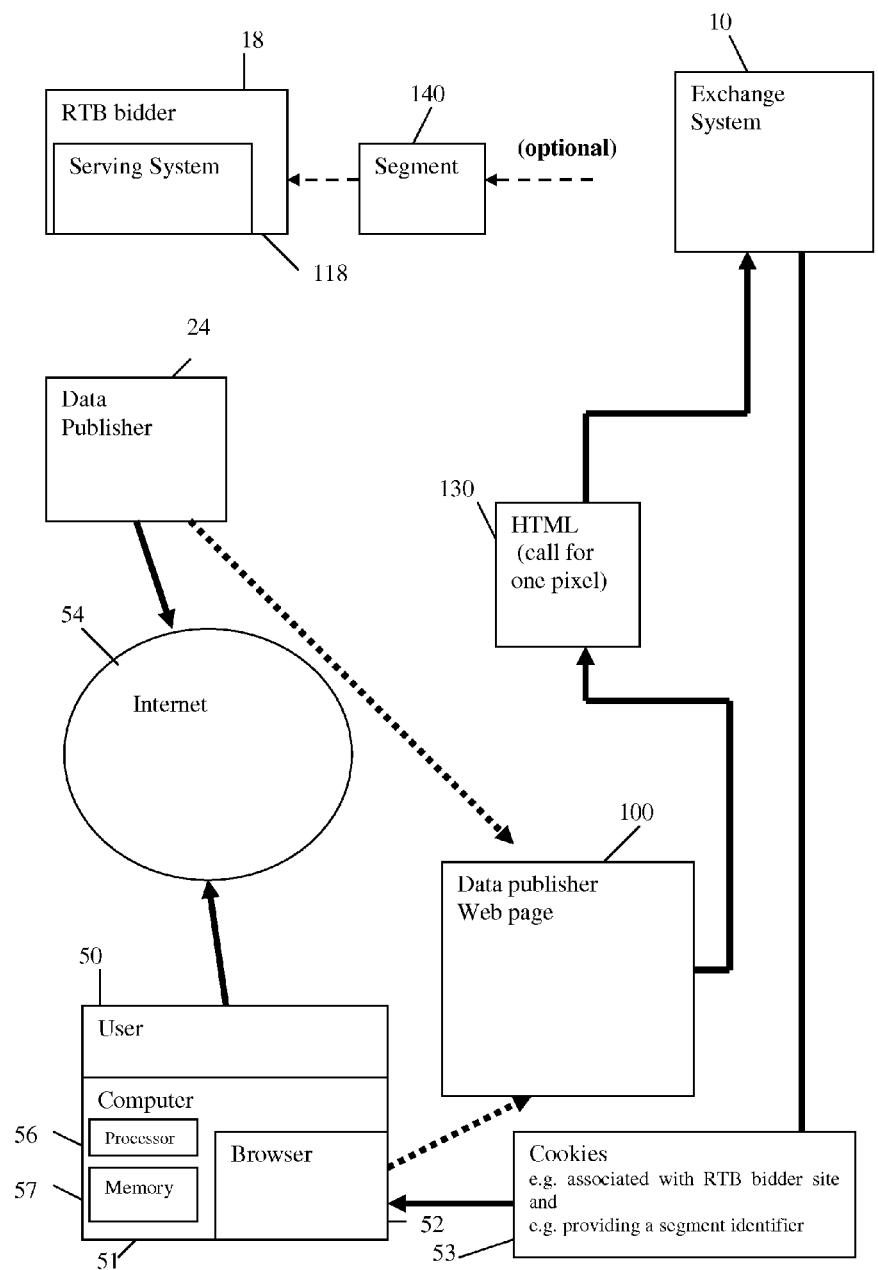
FIG. 4A depicts an exemplary process for the exchange system to "tag" a user (e.g. with a buyer tag) on the user's access to a data publisher Web site, according to an embodiment of the present invention.

For each client, such as an RTB bidder 18, the exchange system 10, for example during the User Session I process (202) may tag a user with cookies to identify the user for a client such as the RTB bidder 18, with a segment definition maintained on the database 370. All of such data may be stored in memories, such as in database 370 within memory 307 (See FIG. 3). Such a tag may be called a "buyer's tag". FIG. 4A depicts an exemplary process for an exchange system 10 to receive a user request, re-directed from a data publisher 24 Web server (e.g. 212a) and provide the user with cookies to associate him or her with a segment for the RTB bidder 18. In FIG. 4A, the Internet user 50 is a common person, for example, using a home computer 51 connected to the Internet 54 and using a browser program 52 to search for Web sites. The computer 51 may comprise a processor 56 to operate the browser program 52 and a memory 57 to store the code for the browser program 52 (in FIGS. 4a and 4b processor 56 and memory 57 are depicted to relate to computer 51 as a whole). The user 50 may open the browser 52 and accesses a Web site, by, for example typing for example the Universal Resource Locator (URL) of a Web site of one of the data publishers 24 (see also FIG. 1). The user 50 in this example intends to open a Web page 100 of a Web site which has information concerning a specific subject, such as fantasy baseball, so that by accessing this site a data publisher 24 can associate this user as "interested in baseball".

Through, for example, an agreement between the owners of the exchange system 10 and data publisher 24, the Web site of the data publisher 24 (e.g. on Web server 212a) may be arranged to re-direct user requests content requests to the exchange system 10. For example, the code (e.g. HTML code) for the Web page may contain a code, such as for example a known "HTML re-direct" code, to make user's browser 52 request re-direct to the servers of the exchange system 10. It is known to set up such a request by having the data publishers' Web page 100 require some content, for example, one pixel of content from the exchange server 10. In this scenario, the re-direct 130 creates a request on the exchange system 10 to send the pixel content information to the browser 52. Once this request is accepted, for example, by the data publisher interface 321 (FIG. 3) of the exchange system 10, segment information 140 may be written to the client cookies under the RTB bidder Web site space (more then one buyer cookie can be set at this session). The cookie 53, containing information, may identify the RTB bidder 18 and may also provide data to associate the user with a segment (e.g. an initial segment or later an optimized segment) that corresponds to this user interest. Such a cookie may be written, using standard techniques for writing or creating "cookies" (e.g. text to a file with delimiters, in a format according to the data buyer).

On the computer 51 of the user, the cookie may be stored in the memory 57 and can be accessed for example, when running the browser program 52. "Real" or "virtual" information may be written to the cookie. The cookie, once written to the computer of the user, may associate the user with the segment for his or her subsequent access to any RTB bidder-controlled Web page advertisement space. Other methods and devices of associating a user with a segment may be used.

Collecting User Response Data

Figure 4B:
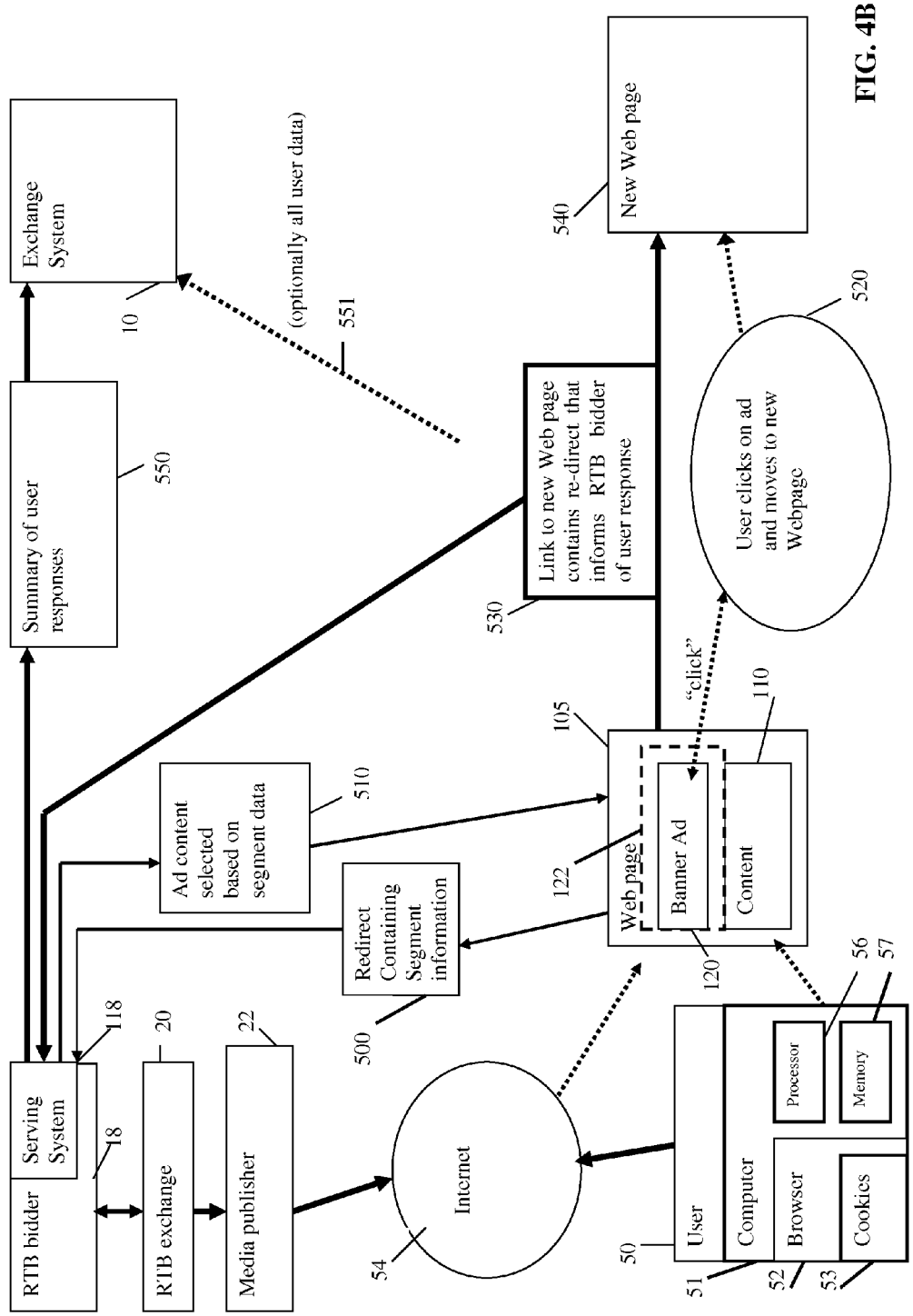
FIG. 4B depicts an exemplary process for using a buyer tag for obtaining segment information from a user's access to an advertisement on a Website of a media publisher, according to an embodiment of the present invention.

FIG. 4B depicts an exemplary process for obtaining segment information by the RTB bidder 18 and exchange system 10 from a user's access to an advertisement on the Web site of a media publisher 22. The user 50 (e.g., the person using the home computer 51 connected to the Internet 54 and using the browsing program 52 (stored in memory 57 and operated, e.g. by processor 56) accesses a Web page 105 of a Web site run this time by a media publisher 22, by, for example, typing in the URL of a selected site of the media publisher 22.

As part of the site content (e.g. the content of the Web page 105, written in HTML for example) a frame 122 may be allocated to advertisements (for example by the media publisher 22, the site owner). The frame 122, in this example, has been programmed with for example a HTML re-direct procedure that, for example, may have been provided by an RTB Exchange 20 (see also FIG. 1). The RTB bidder 18 made (and won) a bid for the frame as advertising space through the RTB Exchange 20. In such an example, the redirect then redirects 500 to the RTB bidder 18, who obtained the space. The RTB bidder 18 may supply the content for the advertising space, content user 50 ultimately sees. The redirect comes to the server 118 of the RTB bidder 18 as a request for frame content. Other redirect or advertising methods may be used with embodiments of the present invention.

Once the request arrives at the server 118 of the RTB bidder 18, processors connected to the server 118 may analyze the "cookie" or other information related to the request. The cookie 53, e.g. stored in memory 57 were read by the browser program 52 and transferred to the server 118 as part of the attempt to access the Web site of the media publisher 22. In this example, this cookie information (shown at 53) contains the segment identification as was provided in FIG. 4A.

The cookie information may be used by the advertising serving system 220 of the RTB bidder 18 to determine what advertising campaign and advertisement may be assigned to the user 50. Other advertisement assignment methods may be used. According to this determination, specific advertising campaign content (a specific advertisement, e.g. 510) is returned to the frame area (frame 122) of the Web page 100. The RTB bidder 18 may document the data provisioning, making a record of the advertising campaign content 510 that was sent to the user 50.

If and when the user 50 clicks (see 520) on the advertisement (e.g., using a pointing device to move an on-screen cursor and indicate that the advertisement is selected or accessed) on frame 122, to link to a new webpage 540, part of that link, for example, part of the HTML link command, may include a redirect (see 530) to the server 118 of the RTB bidder 18. The redirect may inform the RTB bidder 18 that the user 50 made a response for this particular advertisement (e.g. it may report that the user "clicked"). The RTB bidder 18 documents this information, for example, storing a record of it on the server 118. Measures of success or response other than "clicks" may be used. The serving system of the RTB bidder 18 (e.g. via the RTB/Exchange module 315), will transmit data in summary form from this user's access and others to the exchange system 10. Optionally, as mentioned above, all user requests (e.g. 500, 530) may, in an alternative embodiment be routed to the exchange system 10, instead of the serving system 118 of the RTB bidder 18. Such routing may enable the exchange system 10 to perform optimization in real time.

Segment Definitions/Database

The exchange system 10, in tagging users with segment or group identifications may use segment combinations based on definitions maintained in a table (e.g. a segments definitions table) in the database 370, which may be stored in a memory, e.g., memory 307. To create the segments or groups, the exchange system 10 may collect data, and such data can come from for example data publishers 24 (data sellers) (FIG. 1), although other sources may be used.

For example, segments might concern subject areas such as sports or music. A segment can be specific, such as for example segments concerning interests in subject areas like basketball or jazz. Segment definitions can include segments of different types, including combination (compound) segments. As an example a group or segment may contain:

(1) Jazz
   (1.1) does not relate at all
   (1.2) rare
   (1.3) occasionally
   (1.4) Intensive Such a segment provides a subject such as jazz and provides parameters concerning jazz interest, identifying a user's interest in jazz as "intensive" for example. Specific users are associated with the parameters. This jazz interest segment may be an example of a "behavioral" segment and can be combined with other types of segments, e.g. user location, or user age segments to form segment combinations.

A combination (e.g., compound) segment may include segments grouped together according to an analysis process, such as, for example, the grouping of the segments 'Intensive Jazz' and 'football fan' into a combination.

The operator of the exchange system may generate segment combinations to be used for "tagging" users. The segment combinations may include behavioral segments.

The structure of the behavioral segments table in one embodiment has the form (other forms may be used, and other content may be used):

Data Buyer
  Behavioral Segment-1
    User Parameter-1,1
      Parameter Value-1,1,1
      ...
      Parameter Value-1,1,n
    ...
    User Parameter-1,n
      Parameter Value-1,n,1
      ...
      Parameter Value-1,n,n
  Behavioral Segment-2
  ...
  Behavioral Segment-n ...
  (non-behavioral segments can be included, instead of or along with behavioral segments)

For example, a behavioral segment combination based on users that "get updated with news every 3 hours or more" and "go to sport event every week or more". for example:

User Parameter-1 = Exposures to sport events

Parameter Value-1,1 = daily basis
Parameter Value-1,2 = weekly
Parameter Value-1,3 = daily Monthly
Parameter Value-1,4 = monthly basis
Parameter Value-1,5 = rare
User Parameter-2 = Frequency of news exposure Parameter Value-2,1 = every 3 hours or more
Parameter Value-2,2 = 3 hours to 1 day
Parameter Value-2,3 = 1 day or more Other structures for segments or groups, and other data, may be used. Additional segments definitions, such as behavioral segments, e.g. "likes to swim", or "surfs the Web in late evening" may also be added. Additional parameters such as "status" can also be maintained as part of the behavioral segments table structure, such as can be seen in this further example:

| Column | Description | Example |
| --- | --- | --- |
| Segment ID | Identification of the segment | 3344556 |
| Minimum value | Value range of this segment | 1 |
| Maximum value | | 5 |
| Creation date | The data that this segment was defined | 13 Apr. 2010 |
| Status | Usage status of this segment - Active/Not Active | Active |

The above example shows the record values for the "User parameter 1" above.

Figure 5:
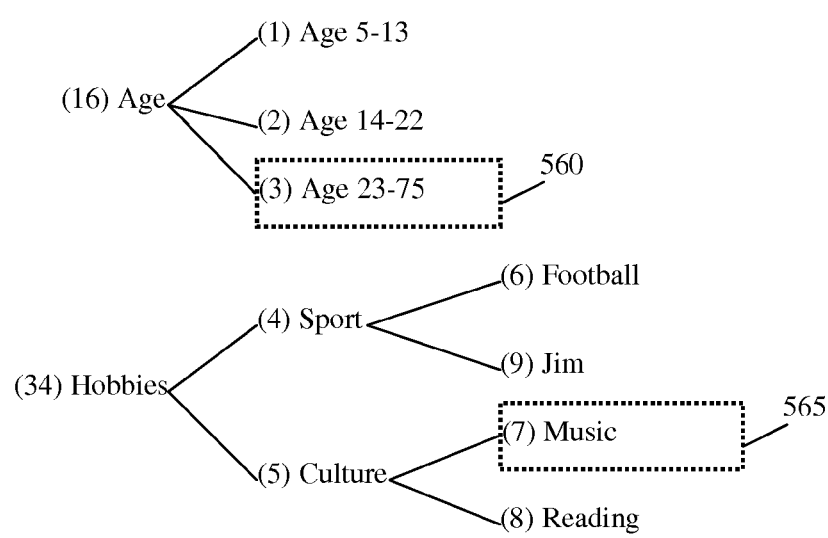
FIG. 5 depicts a mapping of a user request for advertisement data, according to an embodiment of the present invention.

The exchange system 10 may identify each user with one or more segments. For example, when a user accesses a Web site of a data publisher, each user request may be mapped to the relevant segments according to the user profile and collected data. In one example, a single user request for advertisement data can be mapped to tag 3, 7 (age 23-75, like music) or any other combination. In FIG. 5, one user request for content data from a data publisher 24 Web site may, for example, be mapped to tag 3,7 (age 23-75, likes music) (see FIG. 5 at 650, 655). Other combinations for mapping are possible.

Service Request Details

An operator of a serving system, such as for an RTB bidder 18 may execute a service request (e.g. 205, FIG. 2). A service request from a client, such as an RTB bidder 18 may include setting parameters for the cookies definitions that the exchange system 10 will use to "tag" users (and thereafter the buyer (RTB bidder 18) will received and process). The service request may also include additional (optional) settings for the segments that the buyer (RTB bidder 18) would like to use (such as for example filtering). The following parameters may be used (other parameters and other structures may be used):

| Name | Description |
| --- | --- |
| Minimum calculated variety | the segment variety (as calculated by the server while creating/tracking the segment) |
| Maximum segment age | Maximum number of days (segment age) allow for this bidder |
| Maximum number of segments | maximum number of supported segments (for single user) |
| Segment KEY identification range | Identification range (for example 10000 . . . 19999) |

Following the transmission of a service request (205, FIG. 2), the exchange system 10, may perform a system configuration (210, FIG. 2), where the exchange system operator may set parameters and variables for the optimization analysis. For example, the exchange system operator may perform a data set up. Values may be set, for example, to use compound segments with variety better than "XXX" percent.

In data setup, various data points may be set based on, for example, default values or on creative-specific data. In one embodiment, data points can be set such as:

Min (Minimum) Decision Data: A value which may reflect what is considered a high enough volume to make a decision. This may be based on a few data points, such as for example:

Min (Minimum) Qualification Volume: A value which may reflect what is the minimum needed amount of data for each behavioral segment to determine the quality of that segment for a given creative or other advertisement. For example this value can be 25 clicks which means that when the users of any of the behavioral segment generate a total of at least 25 clicks on the creative, the segment quality is reached for that creative.

Min (Minimum) Qualification Level: A value which may reflect what is the minimum needed performance level to define a given behavioral segment as qualified. For example the MinQualification Level can be a CTR (where CTR may be a value reflecting the percentage of those clicking on a link out of the total number who viewed the link or text advertisement) of at least 0.5%.

Min Qualified Segments for Optimized Run: A value which may reflect what is the needed amount of behavioral segments that where identified based on the above parameters as qualified segments to start the optimized run.

In one embodiment, data setup can happen based on a number of methods, such as by sending data from the server system 118 of the RTB bidder 18 directly via the serving system based on a protocol such as XML. This direct sending could occur, for example as an automatic process where the data is located and sent upon the transmission of the service request. Additionally, the data set up could occur manually, such as for example, the data being entered manually once and/or adjusted for every new creative.

User Session II (Learning Runs/Testing)

The RTB bidder 18 may need to identify, for each new advertising campaign, the segment combinations or groups that most efficiently maximize (or combinations or groups that maximize to a certain standard, possibly not the most effective degree) the conversion ratio for the advertisements of the campaign. In deciding segment combinations to choose and rely upon in placing advertisements, an RTB bidder 18 may test an advertising campaign and its related advertisements (and through this test the exchange system can optimize by "learning" optimized segment combination configurations) For example, assuming a campaign budgeted for 1,000,000 exposures or impressions of campaign advertisements on various Web pages, the RTB bidder 18 may, for example, allocate as smaller amount, say 5% of the exposures or impressions (50,000) as testing data to find out what may be the best segment combination.

The advertisements in tests may be exposed to users who can be associated with one or more segment combinations. For example an advertisement could be tested to users associated with one segment, such as, Segment 1: "male", "age: 25-30", "likes to travel". The advertisement can also be tested to users associated with another segment, Segment 2: "female", "female: 25-30", "likes to travel". Based on the results of the testing, the RTB bidder 18 may find that the particular advertisement has a better response with users in Segment 1. The remaining exposures may be routed to what are identified as the most effective segment combinations (e.g. those segment combinations from the tests which are thought to provide the highest conversion ratio). The determination of the most effective combination of segments may be made according to the constraints, such as available time frame for the campaign, income model, expected income, existing alternatives and other factors.

In order to determine the best or an optimal segment combination, the RTB bidder 18 may use, as one method, a segment matrix. Servers employing such systems may generate different combinations of segment definition parameters. For example, from segment or group definitions may have a structure such as:

| (1) Age | (2) Gender | (3) Time of day | (4) Exchange Server Segments |
|---|---|---|---|
| (1.1) 10-15 | (2.1) Male | (3.1) Morning | (4.1) Seg 1 |
| (1.2) 16-25 | (2.2) Female | (3.2) Noon | (4.2) Seg 1 |
| (1.3) 26-39 | | (3.3) Night | (4.3) Seg 1 |
| (1.4) 40-120 | | | (4.4) Seg 1 |

Segments from the exchange system 10, such as the segments from column (4) in the example above, can be included in the segment combinations. For example, a "media optimization" algorithm may have identified these segment combinations, based on data previously collected from user requests for advertising content. For example, the calculations may have been computed "new" for each campaign, without old data, for example, from historic campaigns. However, segment combinations may have been identified in other ways. Exchange system 10 segments can include behavioral segments, alone or in combination with other segments. The segment matrix of the serving system 118 of the RTB bidder 18 may create a list of combinations such as the following and allocate exposures to each one:

| Segment Combination | Exposures |
|---|---|
| 1.1-2.1-3.1-4.1 | <number of exposures n the campaign> * <percentage allocated for the test>/ <number of combinations> |
| 1.1-2.1-3.1-4.2 | |
| 1.2-2.1-3.1-4.1 | |
| . . . | |

In the example above, each combination may be tagged with or stored with, or have added to it, a unique ID and document (e.g. a file or database record) to allow analysis of the responses. As the serving system 118 of the RTB bidder 18 performs its combination tests (exposing the advertisement to identified groups), it may collect user response data. Each user who carries cookies can be mapped to a one of the segment combinations, and can be served an exposure to the advertisement.

The RTB bidder 18 may collect the responses and summarize them, for example, to report to the exchange system 10 concerning the responses gathered from users carrying the exchange system segments. An automatic interface in one embodiment allows the RTB bidder 18 to report on segment behavior, such as hourly, daily or every week. The summary report may, include records showing for example, an advertisement ID, a segment ID, a count of the users who participated or provided responses and a conversion ratio for the advertisement based on the participants. Other data may be included. Such a report may have a record format such as:

| Field | Explanation |
|---|---|
| Campaign unique ID | Identifier of the campaign |
| Segment identification | The segment identification, provided by the segment-providing system 10 that was used |
| Conversion ratio | A numeric value of conversions |
| Group size | Number of responses actually counted |

Following the format above, responses for one advertisement may look like the following:

| Advertisement ID | Responses | | |
|---|---|---|---|
| | Segment | Percentage | Group Size |
| 1 | 1 | 0% | 123 |
| | 2 | 0.005% | 22345 |
| | 3 | 23% | 12 |
| | 4 | 0.04% | 0 |
| | 5 | 1% | 0 |
| | 6 | 0 | 0 |
| | 7 | 0 | 121 |
| | 8 | 0 | 333 |
| | 9 | 2% | 432 |
| 2 | | | |
| 3 | | | |

The example above may be transmitted to the exchange system 10 from the serving system 118 of the RTB bidder 18. In some embodiments, a group size value may indicate or show the number of users with the segment exposed to the advertisement. In some embodiments a value may be included indicating or showing the percentage of users who responded to the advertisement.

Embodiments of the present invention may further provide for a "complete" or full data producing system, where all transactions are routed thorough the exchange system 10, such as through the RTB system module 365 (FIG. 3) and where they are not routed through the serving system 118. In such an embodiment, user requests for content and user responses may be routed through the exchange system 10. Using this method, the exchange system 10 can receive all information that pertains to a segment and can perform optimization in real time. In such an embodiment, the RTB system module 365 may process without any statistic report from the RTB bidder 18 (data buyer).

Optimization Process Details

After receiving data from a serving system 118, the exchange system 10 may analyze the data and create new, optimized segment or group combinations or groups of the exchange system-provided segments, such as by combining segment combinations, or by dividing or altering a segment combination. One goal of segmentation is to find large groups of users who respond consistently and reliably to advertising. It is currently thought that the best sets of behavioral segment combinations are ones that have the highest probability of identifying high performing users for any campaign. In performing segment optimization, the RTB system 365 may call or operate in conjunction with a segment planner module 350. (See FIG. 3).

Figure 6A:
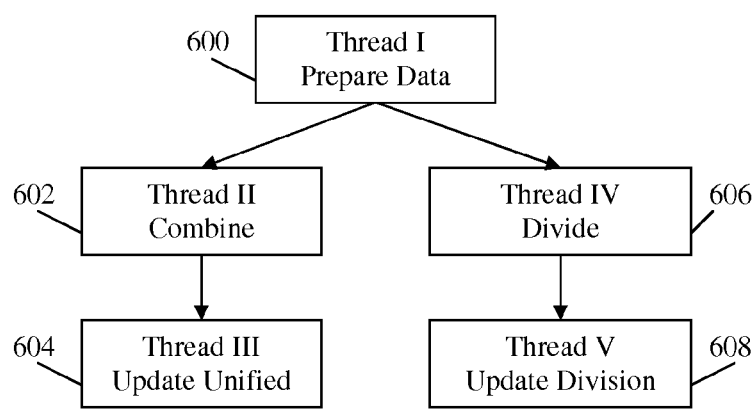
FIG. 6A depicts exemplary processing threads for segment combining and dividing/alteration processes according to an embodiment of the present invention.

FIG. 6A depicts exemplary processing threads that may be used, for example, within a segment planner 350 of the RTB system 365 (FIG. 3) to implement segment optimization, such as combining segment combinations and dividing or altering a segment combination. In FIG. 6A, a first process (e.g., "Thread I") 600 when executed by a processor (e.g., processor 305, FIG. 3), may analyze the test data received concerning an advertisement and prepare that data for combination and/or division/alteration processing. The first process may use this data to identify those segment combinations that were the most "successful", such as, for example, if the segment has conversion ratio data that shows that the segment in question gave the advertisement a response level (e.g. conversion ratio) that was above a certain, pre-designated minimum performance lift value. The first process ("Thread I") 600 may mark a particular segment combination that achieved a high response as "approved for qualification". Such "approved" or "qualified" segment combinations may, for example, be combined with other segment qualified combinations to form "unified" combinations, as is described below. Other combinations, such as for example combining "qualified" and non-qualified segments are possible.

A second thread (e.g., "Thread II") 602 may when executed by a processor (e.g., processor 305, FIG. 3), seek, for example, to examine all identified "qualified combinations" (e.g. a segment combinations marked as "approved") and then seek to group such "qualified combinations" into combined segment combination groups (e.g. "unified combinations"). In one embodiment, qualified combinations of related advertising of a multitude of data buyers could also be grouped and searched for unified combinations. For example, all data received from all data buyers (e.g. many RTB bidders 18) may be processed together.

In an exemplary embodiment, a unified combinations table may hold data concerning the grouping or combining of qualified segment combinations into unified segments. A unified combinations table may hold the aggregated data from the qualified combinations of all advertisements currently being processed at a current point in time. In one exemplary embodiment, the second processing thread (e.g. Thread II) 602 may compute a "grade" or score representing the quality of a given unified combination as a potential behavioral segment. Such a grade may show what quality of behavioral segment would have that is based on this combination and potential unified combinations can be deleted or kept off the unified combinations table based on this grade.

A third thread in an exemplary combining process (e.g., "Thread III") 604 may, when executed by a processor (e.g., processor 305, FIG. 3), update the current set of behavioral segments being used for a given advertisement according to the new unified combinations. In such an exemplary process, the thread may determine matches between ones of the current behavioral segments and the unified combinations. A match might be found, for example, for a unified combination that has the highest percentage overlap between users included in the behavioral segment and the users included in the unified combination. When a match is found, the exchange system 10 may compare the entries from the united combinations table with the current set of behavioral segments, e.g. the set of initial segments, and update and/or delete the current behavioral segment definitions based on the comparisons.

An exemplary embodiment may employ two additional threads for segment dividing and altering. One thread (e.g. a "Thread IV") 606 may, when executed by a processor (e.g., processor 305, FIG. 3), examine user response data (e.g. data from the buyer report table) and identify segment combinations which may be candidates for dividing or other alteration. For example, such a thread may identify segment combinations that have low Var values (e.g. low lift variation) but have a minimum response volume (e.g. include reported data from at least "X" number of users). Other dividing criteria are possible. For those segment combinations that are identified as "candidates" for division, the thread may analyze the data base records that include the sub information of the segment to determine if it may be possible to divide the segment combination in question into two or more other segment combinations. For example, assuming a behavioral segment combination "X" has poor results and the combination carries an age segment parameter, e.g., Age: 20-30, the exchange system 10 may add or link to the segment (if the other segments parameters are available or creatable), smaller age group segment parameters, for example "segment A: 20-24" and "segment B: 25-30. The exchange system 10 may also receive additional user data on the segment combination and may process the user response data according to both the "existing" larger age segment parameter of 20-30 and also to "candidate", smaller, segment parameters of 20-24 and 25-30. After a pre-determined time period, the exchange system 10 may evaluate the results comparing, for example, the results of the segment within existing segment parameter and candidate segment parameters, and determine if the segment in question should be divided.

For example, a subsequent thread (e.g. a "Thread V") 608 may when executed by a processor (e.g., processor 305, FIG. 3), compare the segment combinations in a divided combinations table with the current behavioral segment combinations and update, replace or change the current segment combinations.

Optionally, when a unified combination (e.g. created in the combining process described above) is not performing well, that unified combination can also be broken again into its constituent approved combinations. Segments combinations which are candidates for division may be identified and stored on a table (e.g. a divided/altered combinations table). As data is further collected (using the original, non-divided segment, for example) that data can also be applied, as applicable, to the "candidate" segment possibilities. In one embodiment, Thread IV 606 may also identify segment "candidate" combinations, e.g. to the operator of the exchange system 10, in a report.

Figure 6B:
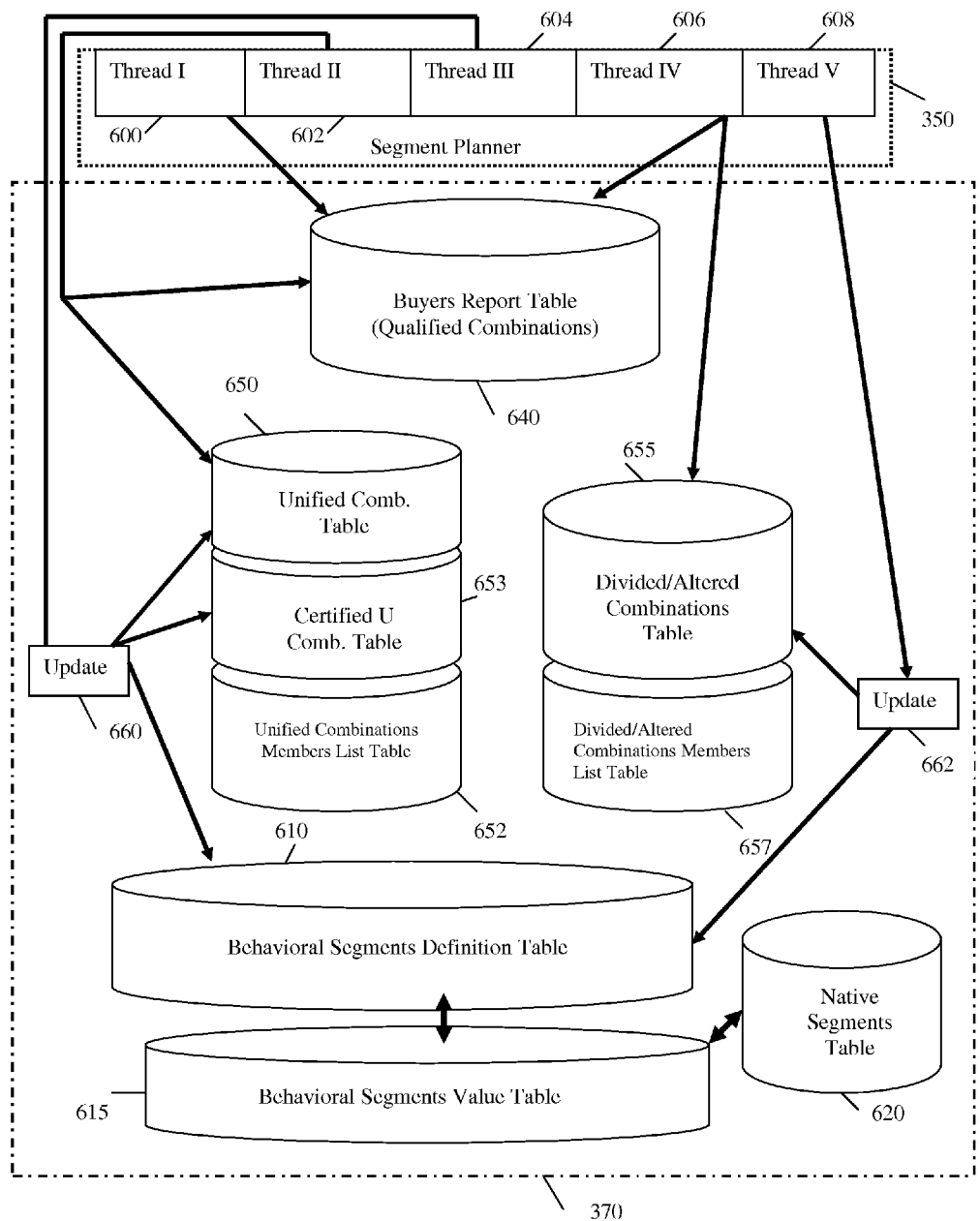
FIG. 6B depicts data tables used within the database of the exchange system and accessed by exemplary processing threads for segment combining and dividing/alteration processes, according to an embodiment of the present invention.

FIG. 6B depicts exemplary processing threads e.g. threads I-V (600-608) and shows data tables that may be used within the database 370 during such processing in one embodiment.

In database 370, an initial set of behavioral segment or group definitions for a client, such as an RTB bidder 18, may be found in a behavioral segments definition table 610, where, for example, behavioral segment definitions may be stored (e.g. in tree form). Such tables may be stored in a memory such as, for example, memory 307 (FIG. 3). Example embodiments of structures for a behavioral segments definition table 610 are described herein (see, e.g., section: "SEGMENT DEFINITIONS/DATABASE").

The initial set of segments or groups can be set based, for example, on manual definitions of the exchange system operator. The segment combination data of an exemplary behavioral segments table 610 may also be based on events data, such as data provided by a data publisher 24 (or data seller) or events data previously received from the same client or from other clients (for example in a system that permitted data sharing between clients). Optionally, the initial set of segments may be based on data provided by the serving system 118. In FIG. 6B, a native segments table 620 may hold definitions of user parameters as provided by, for example, data publishers 24. The exemplary native segments table 620 may have a structure such as (other structures and other data may be used):

| Column | Description |
| --- | --- |
| Parameter ID | Identification of the segment |
| Publisher ID | Value range of this segment |
| Data range | Min-max (minimum-maximum) values of the data provided by this publisher |

Information concerning users from the native segments table 620 may be referenced in the behavioral segments definition table 610 through relationships in the behavioral segments values definition table 615, which, in one embodiment, has a structure such as (other structures and other data may be used):

| Column | Description |
| --- | --- |
| Behavioral Segment ID | Identification of the segment |
| Behavioral Segment Value | |
| Native Parameter id | Pointer to the source parameter (native) that received from the data publisher |
| Native Parameter Range | Value range that mapped to this segment value |
| Creation Date | The date that this parameter was defined for the first time |
| Status | Usage status of this segment - Active/Not Active |

With regard to the processing threads 600, 602, 604, 606 and 608, FIG. 6B also shows a buyer report table 640. In one embodiment, the buyer report table 640 may contain user response data received, for example, by a serving system 118 of an RTB bidder 18. Examples of user response data sent from a client, such as an RTB bidder 18 are provided herein. Such data may be mapped to a record in the buyer report table 640 with a format such as (other structures and other data may be used):

| Column | Description |
| --- | --- |
| Date | Data origin date |
| Buyer id | Identification of the buyer(e.g. serving system or RTB Bidder 18) |
| Campaign ID | |
| Lift | |
| Var | |
| Volume | |
| Qualification Status | Status of this record: Not processed - reported by the buyer but was not evaluated by the system (yet) Approved for qualification - this record should be used for qualification Rejected for qualification - this record should not be used for qualification Processed - this record has been processed by the system. (has been qualified) |
| Division Status | Status of this record: Not processed - reported by the buyer but was not evaluated by the system (yet) Approved for Division - this record should be used for Division procedure Rejected for qualification - this record should not be used for division Processed - this record has been processed by the system. |

In embodiments where live user response data comes to the exchange system 10, a buyer report table 640 may also include individual records of user responses to test advertising which are then further compiled to segment data for analysis (such as the summary data provided by a serving system). For such embodiments, it is noted that each user with a User ID can belong to between 0 to N behavioral segments. In one embodiment that incorporates the exchange system 10 receiving live user data, rather than (or in addition to) summary reports from a serving system 118, the User ID (or other data) may be used to connect the data in the buyer report table 640 with the data in native segments table 620. In other embodiments other linking data items may be used. For example, in another embodiment User ID may not be kept and the system can link to data that tracks the number of users who have matched to conditions belonging (or defined by) the segments making up the combinations.

Data from the buyer report table 640 may be used in an optimization process for combining, dividing or otherwise altering segment combinations. Threads I and IV, for example, 600 and 606, may use the buyer report table 640 entries for tagging segment combinations as candidates for combining or as candidates for dividing/alteration. In one embodiment, segment combinations which are identified as candidates for combining are further identified as "good" or "qualified combinations", or are given other descriptions. A qualified combination may have a status that is "approved" and in further processing may be combined with other qualified combinations to create a "unified combination."

A unified combinations table 650, a unified combinations members list table 652 and a certified unified combinations table 653 may be used, for example by thread II 602, for creating unified combinations, which may be combinations of qualified segment combinations. Thread IV may also access the unified combinations table 650 and the unified combinations members table 652 (e.g. if acting to divide a unified combination).

In one exemplary embodiment the unified combinations table 650 may have the following structure (other structures and other data may be used):

| Column | Description |
| --- | --- |
| Date | Data origin date |
| Unified combination id | Identification of the record |
| Grade | | and the unified combinations members table 652 may have the following structure (other structures and other data may be used):

| Column | Description |
| --- | --- |
| Unified combination record id | Identification of the parent record |
| Qualified record id | Single member of this unified record |

For optimization involving dividing and altering segment combinations, a thread IV may access a divided/altered combinations table 655 and a divided/altered combinations members list table 657, for example for identifying segment combinations in the buyer report table 640 that may be candidates for segment dividing or altering. An exemplary structure for the divided combinations table 655 may be (other structures and other data may be used):

| Column | Description |
| --- | --- |
| Date | Data origin date |
| Divided combination id | Identification of the record |
| Request Type | Operation type: Remove Segment Add Segment | and an exemplary structure for a divided combinations member list table 657 may be (other structures and other data may be used):

| Column | Description |
| --- | --- |
| Divided combination record id | Identification of the parent record |
| Qualified record id | Single member of this unified record |

Figure 6C:
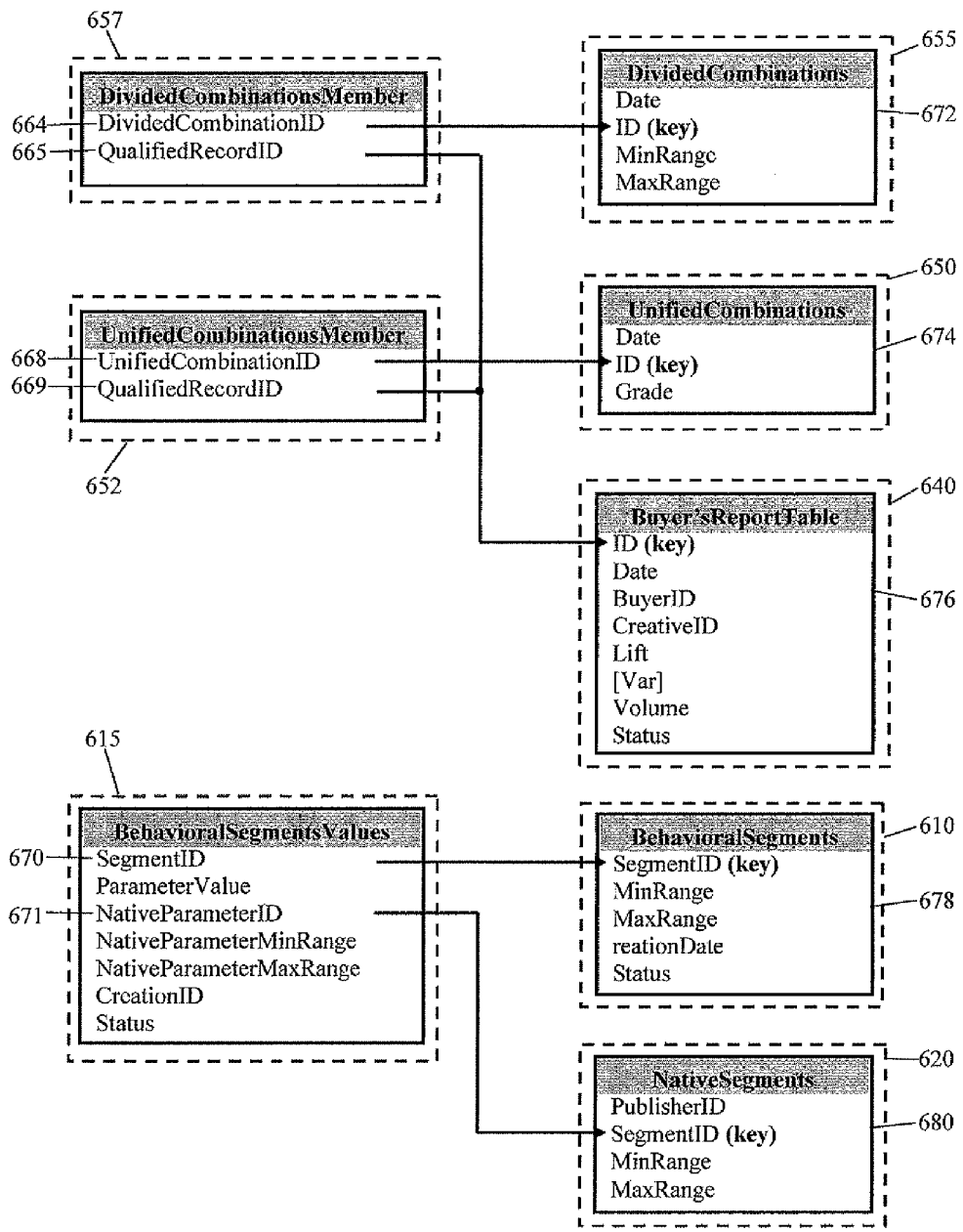
FIG. 6C depicts exemplary relationships for data base tables of an exchange system according to an embodiment of the present invention.

FIG. 6C depicts exemplary data relationships between: 1) the divided combinations tables (655, 657) and the buyer report table 640; 2) the unified combinations tables (650, 652) and the buyer report table 640; and 3) Behavioral segments definition table 610 and the Native segments 680 and behavioral segments values table 670. At 664 and 665, ID entries or other entries in the divided contributions members table 657 may provide associations so that a record (676) in the buyer report table 640 can associate or be associated with a record (672) in the divided combinations table 655. The divided combinations member table record keys at 664 and 665 provide the link.

In FIG. 6D, ID entries 668 and 669 in the unified combinations member table 650 provide an association so a qualified combination record 676 can be included as a unified combination 674.

Behavioral segment information may also be associated in this same way. For example, to field entries 670 and 671 in the behavioral segments values table 615 may enable that entry to associate a behavioral segment definition 678 with an entry 680 from the native segments table 620. Other ways of associating records in a database, however, can be used.

In operating exemplary threads I-IV 600-608, the segment planner module 350 may use a number of parameters concerning the operation of the threads 600-608 and the data tables 610-657. For example, an exchange operator may have a user interface (UI), which is part of the segment planner module 350, and which may be executed by, for example, processor 305 (see, e.g. administrative interface 320), and the operator may set parameters such as:

Minimum Segment CV (Coefficient of Variation) which may be the minimum value that will allow a definition of a segment.

Minimum Behavioral Segments Unified Combinations % Overlap;

Minimum Qualified Combinations % Overlap, which may be the minimum variation overlap between the two segments that can be counted;

Num of Combinations Grade Array[ ] —a array holding a grade for each possible number of qualified combinations in a certain unified combination;

Minimum Pre User Contribution Grade;

Minimum Post User Contribution Grade;

Maximum Num of Segments—the maximum number of behavioral segments that the specific Serving System supports;

Minimum Segment Size—the minimum number of exchange users that a behavioral segment can have;

Number of Segments, Minimum Segment Size;

Value Volume %—what percentage of the users is each parameter value relevant to. The value volume percentage is calculated based on the number of monthly unique users with that value that the exchange system 10 counted in the last month;

Value Volume % Reduction—how much to reduce the weight of the data of that creative for every 1% below X %. The system may also support non linear values;

Creative Age Reduction—how much to reduce the weight of the data of that creative by age in days. The system may also support non linear values;

Desired Creative Age Cut Off—From which age of creative data the algorithm should ignore the data of that creative;

Consistency Reduction—for each creative that the segment planner 350 has enough data to calculate the P-Value for two different time intervals that are at least N days apart from each other, it compares the two P-Values (N is set by the Exchange Operator). Based on the difference between the two P-Values a consistency reduction value is set. It can be set to 100% (=no reduction) or values which are below 100% (=there is reduction) or values which are above 100% (there is a lift). The transformation between the P-Values difference and the consistency reduction value is based on pre-set table that its parameters are controlled by the exchange operator;

Other Data Buyer Reduction—How much to reduce the weight of the data from creative that run in the same serving system but with different data buyers/clients;

Other Serving System Reduction—How much to reduce the weight of the data from creative that run in different serving systems and different data buyers/clients;

Segment Editing/Updating Grade—from which Segment Grade the Behavioral Segment should be edited (meaning that below that grade the segment/combination is not changed); and Segment Deletion (de-activating) Grade—from which Segment Grade the Behavioral Segment should be deleted (meaning that below that grade the segment/combination is (de-activated, put out of used, archived, deleted after a time or otherwise status-edited).

Thread I: Qualified Combinations/Buyer Report Table

Thread I 600 e.g., of the segment planner 350, may identify all "qualified combinations" for a creative by analyzing the recent received user response data and finding, for example, those segment combinations that received a response level above a value for the minimum number of users reported in this group. The may occur, for example, if the "results" (response ratio) for a certain segment were above the minimum value.

In one embodiment, e.g. where the exchange system 10 operates as a computer server, user response data concerning an advertisement that was exposed to a plurality of computer users operating computers connected to the computer network may be received. The users may be identified, connected or associated by the identities of their computers to one or more of a plurality of segment combinations based for example on the respective computers' previous accessing of a data publisher 25 Website. The user response data may provide a user response rate value indicative the responsiveness of the users to the advertisement, where the advertisement may have been transmitted to the computers of the users for exposure to the users from an advertising serving system (e.g. the serving system 118 of an RTB bidder 18) connected to a computer network according to requests generated from a browser program operated by each user (see e.g. 52, FIG. 4B). Thread I 600 in one embodiment, identifies from the user response data, segment combinations having achieved a user response rate surpassing a pre-determined value measured according to one or more user events.

A qualified combination may be indicated as approved with a field marked for the segment combination in the buyer report table 640. A record in the buyer report table 640, following the example structure set forth above, may contain the following attributes (other structures and attributes may be used):

---

Data Buyer
Creative
Qualified Combination-1
  Behavioral segment-n, Parameter value-a
  Behavioral segment-m, Parameter value-b
  ...
  Lift - for this creative, what is the average response rate that this
  combination got for a particular advertisement
  divided by the global average response rate.
  The response is based on the creative's Optimized Event (e.g. clicks).
  Var - Lift variation is a statistic defining the variability of the lift.
  (i.e. Coefficient Of Variation (CV) - the CV)of the data of this
  qualified combination with this creative
  Volume - what are the number of the "cookied" users that have fit with
  this combination.
Qualified Combination-2
...
Qualified Combination-n ...

---

For example for a certain creative a qualified combination might be all users who are Hispanics, between the ages of 18 to 34, and live in the west coast of the United States. Other combinations, using other modalities, are, of course, possible. One example of a qualified combination record is:

---

Creative = x
User Parameter-1 = Ethnicity

Parameter Value-1,1 = Hispanic
User Parameter-2 = Age

Parameter Value-2,1 = Age Group of 18-24
Parameter Value-2,2 = Age Group of 25-34
User Parameter-3 = Geo Area Parameter Value-3,1 = USA, West Coast
Lift = 78%
Var = <24%
Volume = 1.34 million users

---

Figure 7A:
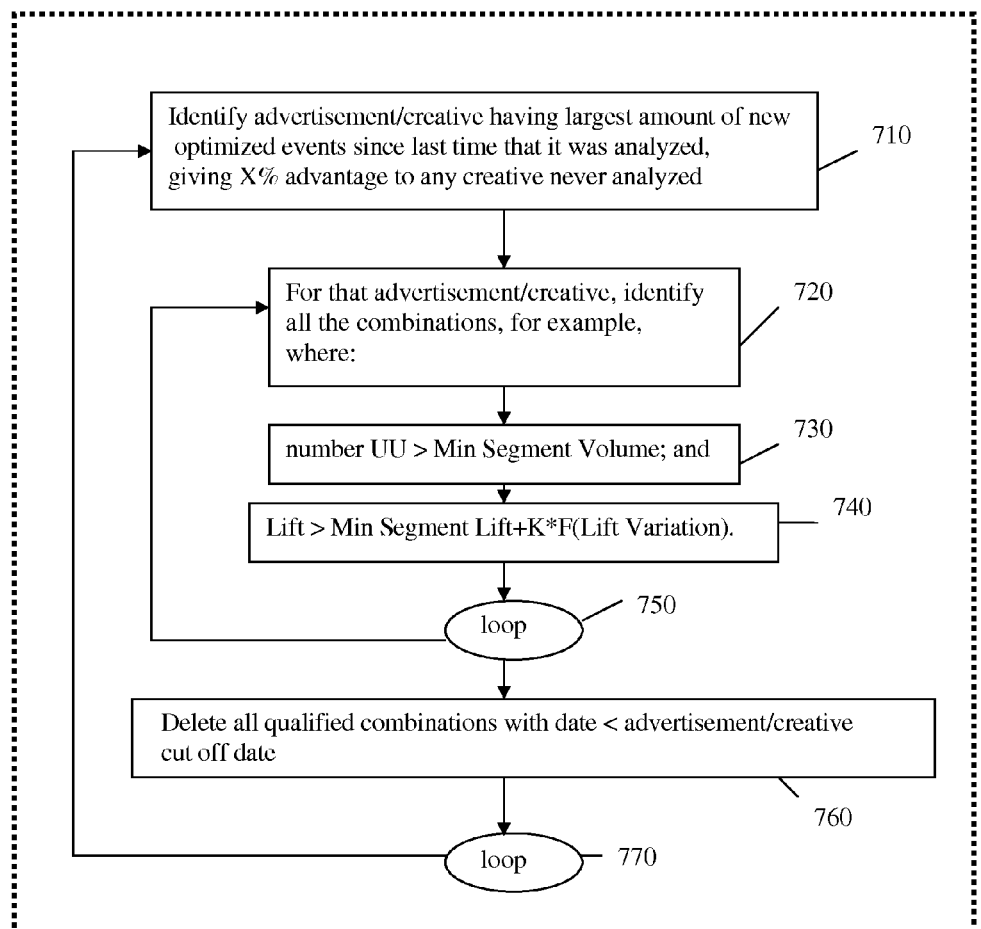
FIG. 7A depicts an exemplary process flow for the qualified combinations, according to an embodiment of the present invention.

FIG. 7A depicts an exemplary process flow for an exemplary segment combination approval procedure (e.g. a "Thread I) 600 in an embodiment of the present invention. In step 710, thread 600 begins an on-going loop or iteration. The first part of this loop identify the advertisement or other creative that has the largest amount of new optimized events since the last time it was analyzed. In this identification procedure, thread 600 may give an advantage, e.g. X % percentage advantage, to an advertisement that has not yet been analyzed. In step 720, thread 600 begins an inner loop, such that, for the identified advertisement, the thread identifies combinations where:

The number UU (e.g. Unique Users, such as the number of users that were exposed to this content) they define is greater than (>) Minimum Segment Volume (step 730); and Lift is greater than (>) Minimum Segment Lift+K*F(Lift Variation) (step 740) (where K is a parameter that may be used to tune the condition according to the actual system behavior on a "real life" situation).

Other combinations may be identified using, for example, other variables. In step 750, thread 600 may loop or iterate to identify all such combinations passing the above tests. Each record in the buyer report table 640 identified by thread 600 as a "qualified combination" (e.g. according to rules described above, such as for example if the volume is bigger than 10,000 and the "lift" is high) will be tagged as "approved for qualification". In step 760, thread 600 may delete qualified combinations with a date less than (<) the creative cut off date. In step 770, thread 600 may loop or iterate and return to the first step (710) of the on-going loop.

In one embodiment of the "Thread I" process 600, each report received from a client/data buyer, such as for example the serving system 118 of an RTB bidder 18, is inserted into the buyer report table 640. Optionally, as thread 600, processes, it may also calculate the "Var" (e.g. variable lift) field for each recorded in the buyer's record table. It may further mark each new record as "not processed" for division (which enables later processing by threads IV and V (606 and 608). If thread 600 determines that a record is not suitable for qualifying, the exchange system 10 may keep it (for historical and/or statistical later analysis). However, in an exemplary embodiment, thread 600 will tag such a record as "rejected for qualification". Obsolete records, such as "rejected" records and "approved" combination records that are out of date, as mentioned above, may be deleted.

Thread II: Unified Combinations

Thread II (602), in one embodiment, may analyze the buyer report table 640 and based on that analysis may update the unified combinations table 650 that holds the aggregated data from the qualified combinations of all the relevant advertisements at the current point in time. In such an embodiment, unified combinations may be calculated using the combined data of many different clients/buyers (e.g. all clients (data buyers) running advertisements to users identified with the same exchange system segment combination at a point in time). In other embodiments, the unified combinations may be calculated separately for each specific data buyer/client As described herein, the unified combinations table 650 (e.g. FIG. 6B) may hold data for all clients or for one client. Following the exemplary table structure described above, entries in the unified combinations table 650 may have the following form (and other data may be stored):

---

Unified Combination-1
  Source Buyer
  Qualified Combination-1
  ...
  Qualified Combination-n
  ...
  Grade.
Unified Combination-2
...
Unified Combination-n ...

---

FIG. 7B depicts an exemplary process flow for a unified combinations procedure (a Thread II 602), according to an embodiment of the present invention. In step 800, thread 602 may begin an on-going loop. In step 810, thread 602 may sort all qualified combination records in the buyers report table 640 by buyer/campaign. In step 820, thread 602 may begin a processing loop. For each buyer, buyer/campaign, thread 602 in step 830 may begin an analysis to locate those qualified combinations which "match" on a behavior basis, such that in a matching pair, triple, quadruple, etc. there is a closely matching response behavior to each of segments in the matching group.

Many different computer techniques can be used to generate "matches". In one embodiment, thread 602 may store (in step 840) all permutations of all record combinations on temporary table (shown at 850) and may, additionally, calculate for each stored record (of a combination) a "Unification Grade" value that may indicate "how much this unified segment (composed of all users who belong to the segments of each qualified combination record included in this permutation) may behave in a unified way (and can be expected respond to advertising content in the same way as they have done so in this sample). Although generating permutations is one way of finding "matches", other techniques such as using recursive algorithms to match pairs, then pairs with other segments, etc. can also be used. After generating the permutations in step 830, the temporary table of records (stored in step 840) may have the form:

|  |
| --- |
| Temporary id |
| List of segments included in this group |
| Unification Grade |

In the calculations of step 840, thread 602 may use only those records from the buyers report table 640 that are "qualified combinations" in that, for example, they have a minimum number of users that were exposed to content and also minimum lift value (represent minimum number of user's responses). In other embodiments, other minimum criteria may be selected.

Once a temporary table (e.g. 850) is ready (for a specific buyer/campaign), thread 602 in step 860 may select those records from the temporary table 850 that surpass a minimum "unification grade" value and may insert them into the unified combinations table 650 as candidates for unification. In step 870, thread 602 may complete the processing for one set of buyer/campaign records and return to step 820 to process another set. When loop 820-870 is completed, thread 602 loops in step 880 and returns to 800 as part of an on-going process and will repeat the analysis, e.g. periodically, to find "matches".

The "Unification Grade" which may be determined by thread 602 (e.g. in step 830) may calculate a value representing how tightly or how "well" the group is unified. The unification grade, for example, may show the group identified in a unified combination could be how reliably and predictably the group behaves. For example, such a value may indicate if the group could respond with the same response numbers to (high or low) to any (or the next) advertisement content. In one embodiment the unification grade is calculated as the gap (in percentage) between the minimum and maximum VAR of the group members.

One sample of sorted records from the buyers report table 640, used for analysis by thread 602 may be appear as follows (the ID column is used only for the example explanation):

| Id | Buyer | Campaign | Segments | Lift Var |
| --- | --- | --- | --- | --- |
| 1 | B1 | C1 | S1 | 2% |
| 2 | B1 | C1 | S3 | 8% |
| 3 | B1 | C1 | S34 | 8.1% |
| 4 | B1 | C1 | S12 | 9.1% |

And from those records, thread 602 may generate permutations which may be appear as follows (the ID column is used only for the example explanation):

| Id | Members | Grade [%] |
| --- | --- | --- |
| 1 | S1, S3 | 6 |
| 2 | S1, S34 | 6.1 |
| 3 | S1, S12 | 7.1 |
| 4 | S3, S34 | 0.1 |
| 5 | S3, S12 | 1.1 |
| 6 | S12, S34 | 1 |
| 7 | S1, S3, S34 | 6.1 |
| 8 | S1, S3, S12 | 7.1 |
| 9 | S1, S34, S12 | 7.1 |
| 10 | S3, S34, S12 | 1.1 |
| 11 | S1, S3, S34, S12 | 7.1 |

Thread III: Updating Behavioral Segments (Unification)

Figure 7C:
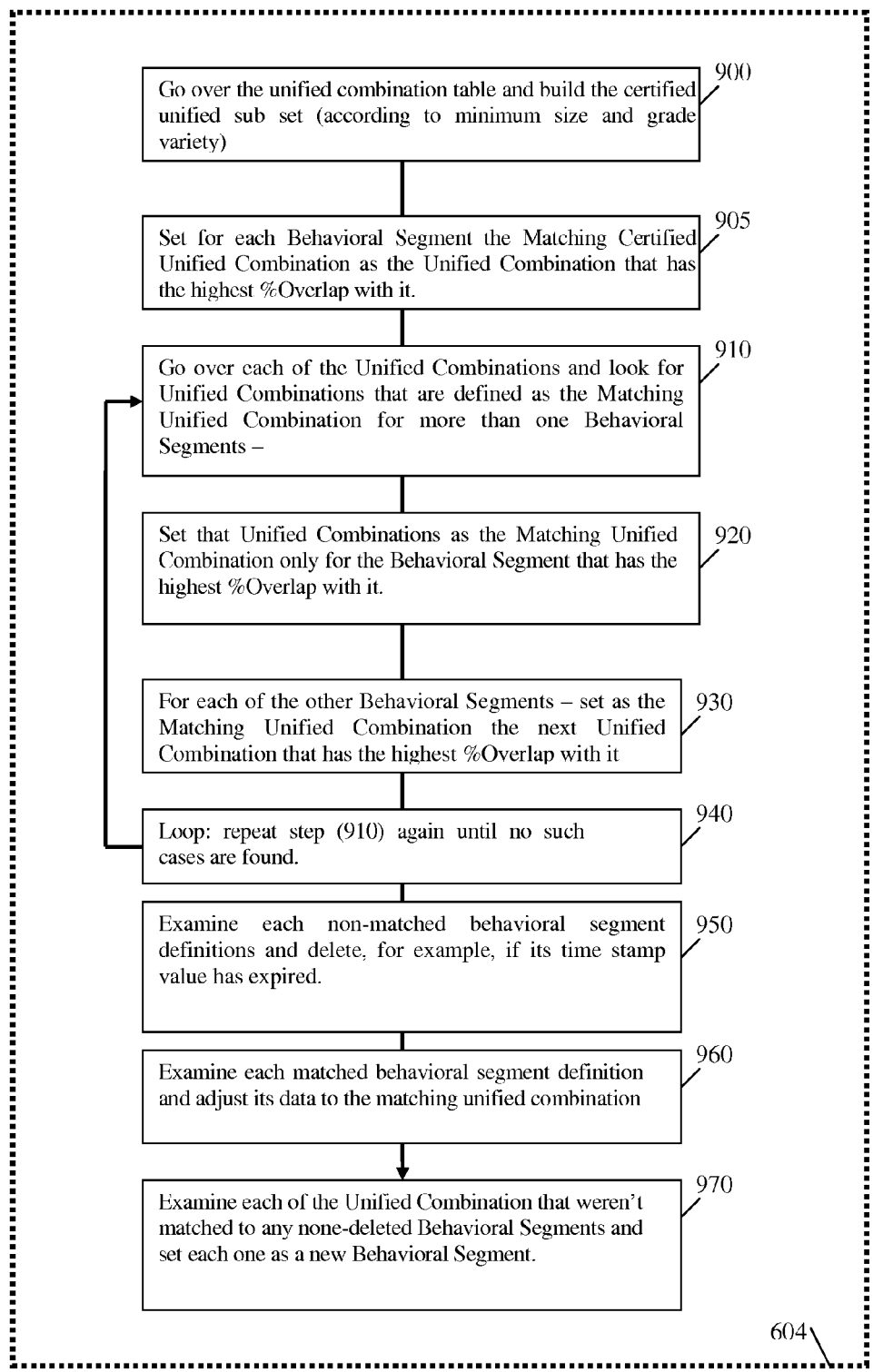
FIG. 7C depicts an exemplary process flow for updating behavioral segments after segment combining, according to an embodiment of the present invention.

Thread III (604) may update the behavioral segments definitions (e.g. in table 610) according to new unified combinations. FIG. 7C depicts an exemplary process flow for a behavioral segments update process (e.g. a "Thread III").

In step 900, thread 604 may go over all unified combinations and prepare the records for the unification procedure. During this process, sub set of records "certify unified combination" list will be created and used later on in this thread. The process of preparing this list may in one embodiment:

Go over the records and group them by the segment combination they describe.

If the total number of members (records in the database that describe the same segment group) is smaller than a minimum pre defined number, stop the certification (for this segment group).

If the gap in the grade between all members is larger than a defined parameter, stop the certification (for this segment group).

If the group passes the above 'tests', a single 'Certified Unified combination' record is inserted to the table (e.g. the certified unified combination table 653 (see FIG. 6B). This record may be used in the following processes of thread 604.

In step 905, thread 604 may set for each behavioral segment corresponding matching certified unified combination that has the highest overlap percentage (%)(with the behavioral segment definition in question. In one embodiment percentage (%) overlap is equal to the number of users that are included in the behavioral segment and in the certified unified combination divided by (/) number of users that are included in the existing behavioral segment. Other criteria for percentage overlap correspondence can be used.

In step 910 the thread may update the segment definition with the new segment examine each of the unified combinations and may look for unified combinations that are matching combinations for more than one behavioral segment definition (source from another buyer/campaign or another buyer). In this process, thread 604 may in step 920 set a unified combination as the matching unified combination only for the behavioral segment definition that has the highest percentage (%) overlap with it. For each of the other behavioral segment definitions, thread 604 may in step 930 set as the matching unified combination the unified combination that has the next highest percentage (%) overlap with that behavioral segment definition. In step 940, thread 604 may loop or iterate, and may return to perform steps 910-930 again until no cases of a unified combination with more than one match to a behavioral segment definition are found. Some behavioral segment definitions may have no matching correspondence with a unified combination. After this process, some qualified combinations may also not be matched to any of the behavioral segment definitions.

In making matches, the value "minimum behavioral segment unifies percentage (%) overlap" may represent a parameter for tuning or optimization. Behavioral segment definitions that have a correspondence to one or more unified combinations through this value may be considered "relevant". Each existing behavioral segment definition that could not be "verified" or matched to one of the unified combinations with this data may be deleted, for example, as a segment that is "not relevant".

In one exemplary embodiment, each existing segment definition that was not matched within a time period (e.g. a "maximum verification time" value) may be deleted. In step 950, thread 604 may examine each of the non-matched behavioral segment definitions and may delete them, for example, if their time stamp values have expired. In such an embodiment, an aging mechanism is applied to ensure that non-relevant behavioral segment definitions have an opportunity to demonstrate their "relevancy" but will be also removed in time. Each behavioral segment definition record may, for example, include a time stamp value. The time stamp value may show, for example, the last time the behavioral segment definition was modified, and this may include an indication of modification based on the whether a match was found for the behavioral segment definition in steps 910-940 above.

In step 960, thread 604 may examine each of the remaining, non-deleted behavioral segments definitions remaining and may update the data. For example, thread 604 may create a new segment to replace the previously used segment. The "old" segment may be kept for a defined time period and then removed. In one embodiment, the exchange system may use the new segment (e.g. for tagging users) from the moment of creating the new segment.

In step 970, thread 604 may examine each of the unified combinations were not matched to a non-deleted behavioral segments and may set each one as a new behavioral segment.

Thread IV: Division Analysis

In one embodiment, Thread IV (606) may analyze records in the buyer report table 640 and identify segment combinations that are candidates for division or alteration. For example, thread IV 606 may process records in the buyer report table 640 having a division status of "not processed" (e.g. "division status" equals (=) "not processed") as thread I 600 may have marked.

Figure 7D:
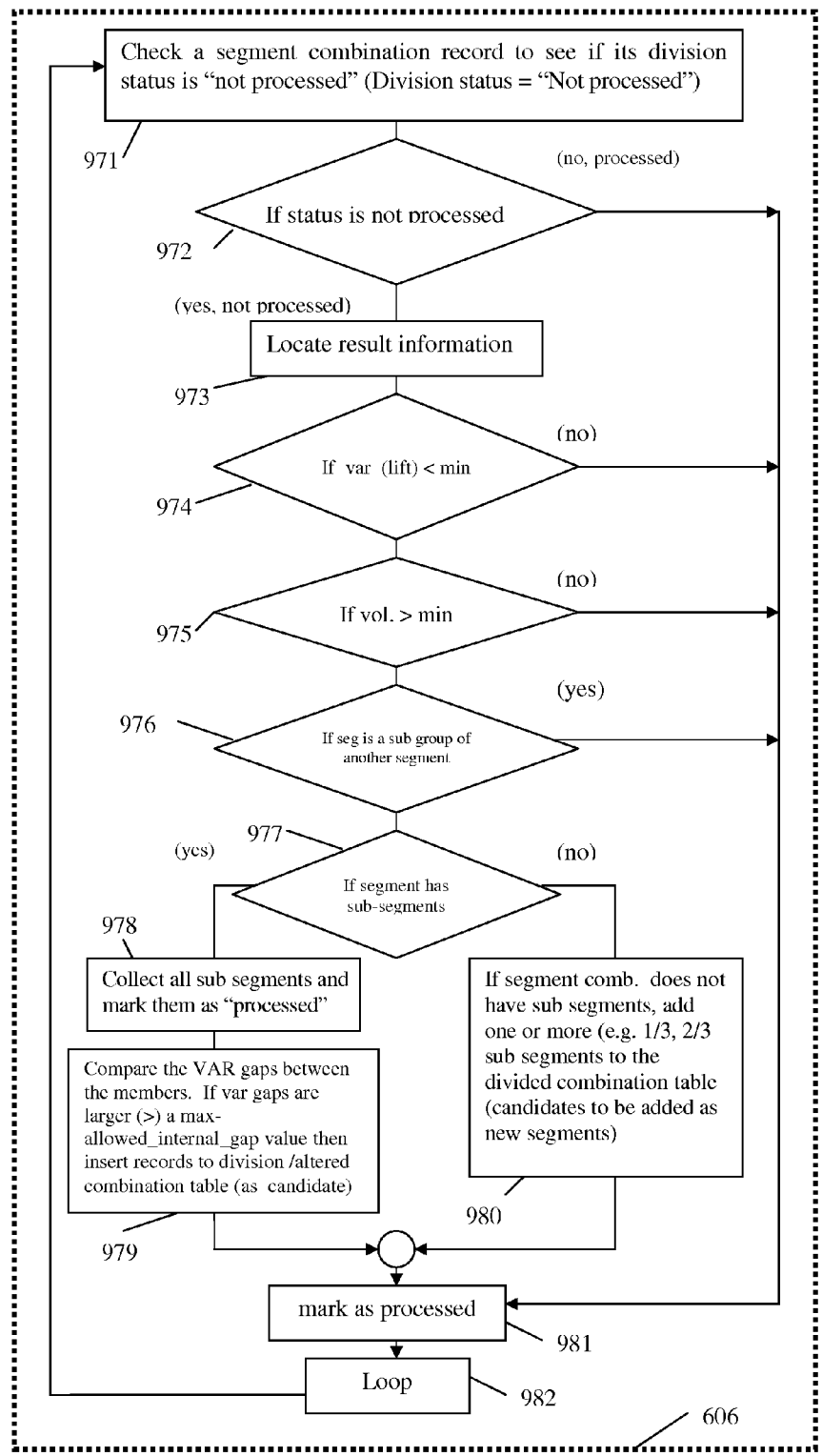
FIG. 7D depicts an exemplary process flow for dividing/altering behavioral segments according to an embodiment of present invention.

FIG. 7D depicts an exemplary process flow of a division analysis process (e.g. a "Thread IV" 606). A first task may be to identify segment combinations that have "poor" or "low" response rates but are not worth simply deleting, for example, segment combinations with low Var (variation lift) results but, a response volume that is greater than a minimum. Such segment combinations may become candidates for division or other alteration.

In step 971, thread 606 may begin a loop to check each segment combination record in the buyer report table (640). In one embodiment, thread 606 may check in step 972 the status of each record to see, for example, if its "division status" field indicates "not processed". Thread 606 may next attempt to identify from the user response data, if there are any segment combinations that can be marked as "candidates" for division.

For a segment combination record that was "not processed", thread 606 may locate or compute a result variable for that segment combination, such as for example the "Var" value (representing lift variation). The user response data may provide a user response rate value indicative the responsiveness of the users to the advertisement, and a user volume value indicative of the number of users exposed to the advertisement by segment combination. Thread 606 may identify from the user response data, at least one segment combinations as a "candidate" for division by, for example, identifying segment combinations having achieved a user response rate that is lower than a pre-determined value and a user volume value that is higher than a pre-determined threshold amount.

If, in step 974, that value is below a threshold, thread 606 proceeds in step 975 to check a second variable, such as response volume (e.g. as discussed in the previous section). In one embodiment, if the response volume is above a threshold, then thread 606 may mark this segment combination (e.g. in step 976) as a "candidate" for division/alteration. If records to do not meet the tests (in this case the var and response tests), thread 606 may move past those records, marking them, for example as "processed" (see step 981). In addition to checking the "var" and "response" variables, other variables could be examined. Records passing the two tests 974 and 975 (or other tests) may be candidates for division or other alteration.

In one embodiment, thread 606 may then analyze a candidate record in step 976 to determine if that particular segment combination is part of any other larger segment definition, such as whether the segment combination in question is a sub group of another segment. Segments combinations which are part of other, larger segment combinations, in one embodiment may be skipped, for example, because they will be handled as part of the analysis for the "parent" of the group. Thread 606 may make such a check by going over the different parts of each group and verifying if overlapping parameters are included (e.g. same parameters, value sub-ranges, etc.). If the segment combination is a sub-combination of another segment, thread 606 may terminate further processing of that segment combination (e.g. marking it as "processed" in step 981).

If the segment is not a sub-group of another segment, thread 606 may, in step 977, analyze the elements of the segment combination in question to determine if, for example, the definitions for the segments that make up the segment combination include segment parameters that would allow the segment combination to be divided. Thread 606 may determine if the segment combination comprises additional segment parameters having values capable of dividing a segment combination parameter currently used to identify user computers in the segment combination. If the segment can be divided, thread 606 may determine if it is possible to divide the segment into two or more sub segments in order to allow later re structure of this segment. One situation where it may not be possible to divide the segment might be where the segment is a "raw segment" with single value (for example, Gender=female). In this case thread 606 may do nothing with this record. In other cases, thread 606 determines additional parameters for dividing. The additional segment parameters may be determined from parameters existing in a segment definition associated with a segment comprising the segment combination.

In step 978, thread 606 may collect all segments that make up the segment combination and mark them as "processed".

For example, a segment combination may have the following segments in the behavioral segment database:

For example: (where Px is behavioral segment)
    (Sa) Segment A is combined from: P1 (1 . . . 6), P2(7 . . . 8), P3(1 . . . 30)
    (Sb) Segment B is combined from: P1(1 . . . 4), P2(7), P3(1 . . . 30)
    (Sc) Segment C is combined from P1(5 . . . 6), P2(8), P3( ) (C and B are included in A)

In step 979, thread 606 may make a determination as to whether new segment records using the sub-segments can be created. Thread 606 may create, for example, new segment parameters from dividing minimum and maximum range values associated with a parameter then currently used. Thread 606 may, in step 979, compare, for example, the "var" gaps (variation lift, response ratio for content) between the sub-segment members (for example, if Var(Vc) is 5%, Var(Va) is 12%, and Var(Vb) is 16% the system can detect that Vc should not be part of the group Va) If the "var" gaps are greater than (>) a threshold amount (e.g. a "max_allowed_internal_gap" value) If the gap is large, for example, thread 606 can determine that the different parts of the segment do not behave the same. then thread 606 may insert two new segment combination records onto the division/alteration table 655. Following the exemplary structure for the division/alteration table 655 set forth above, record entries for the divided records may include (referring to the sample above) Vc as separate group and different definition of Va that does not include Vc inside.

Accompanying linking data may also be written to the divided/altered combinations members list 657.

If, in step 977, thread 606 determines that the segment combination does not have further segment parameters (e.g. it cannot be divided into original parts or vertically) thread 606 in step 980 may create additional segment parameters. Assume, for example, behavioral segment X has a poor results (e.g. it has a low Var value but enough of response that it could be considered a "candidate" for division). If a segment definition for age (used in this segment combination) holds the range of 20-30, then thread 606 may insert two new segment combination records onto the division/alteration table 655 with, for example:

---

Segment parameter A: 20-24 (for new record 1) and
Segment parameter B: 25-30 (for new record 2).

---

Where thread 606 either uses existing parameters from the segment definition or thread 606 creates new parameter, thread 606 may add additional segment parameters to at least one of the segments comprising the candidate segment combination, wherein the additional segment parameters divide a parameter currently used within the segment combination to identify users to the segment combination. As, for example, the age range with parameters 20-30 can be split in to two ranges 20-24 and 25-30 those new ranges will be added to the combination and stored, for example on the divided/altered combinations table 655. A division process (e.g. Thread V, 608) may use those additional ranges to divide the segment. One embodiment may divide a parameter currently used within a segment combination by splitting the range of the parameter into two sub ranges for example to associate the computers of the users to the segment combination.

For each of the additions of segment records in steps 979 and 980, "Thread W" (606) may create a report showing that possible divisions could be made for the segment combinations in question. Also, in another embodiment, if a segment combination that had been performing poorly was a unified combination, thread 606 may alternatively break the unified combination into its constituent approved combinations. For example, where a "candidate" segment combination is a combination of two previously identified segment combinations and a division may be arranged to split the "candidate" segment combination into the two previously identified combinations, rather than adding segment parameters. Other possible methods and techniques of breaking up or altering a segment combination are also possible.

Where a segment combination has been processed as a candidate for division (e.g. in steps 978, 979 and 980), thread 606 may then mark record for the combination as "processed" in step 981 and the loop, in step 982 to locate another segment combination to process.

Thread V: Division Analysis

Figure 7E:
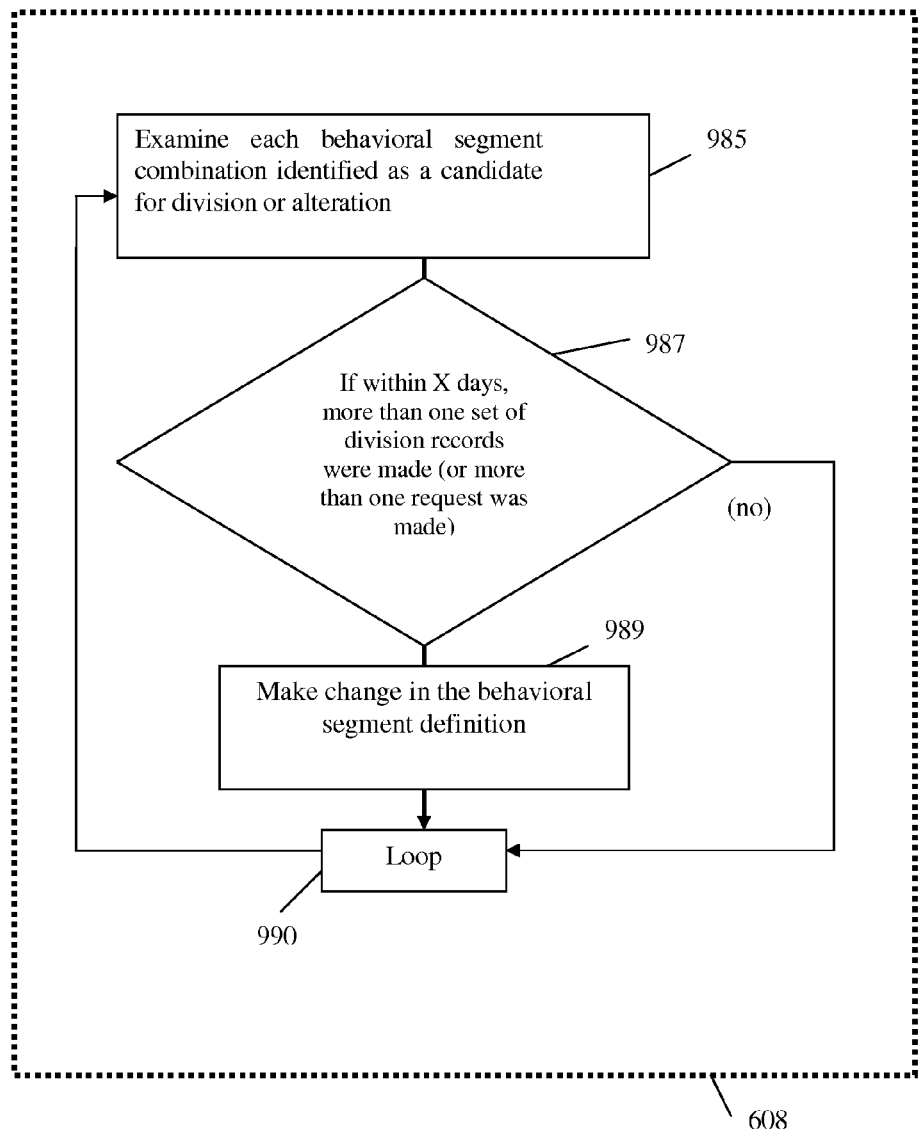
FIG. 7E depicts an exemplary process flow for updating behavioral segments after segment dividing/alteration, according to an embodiment of the present invention.
Figure 8:
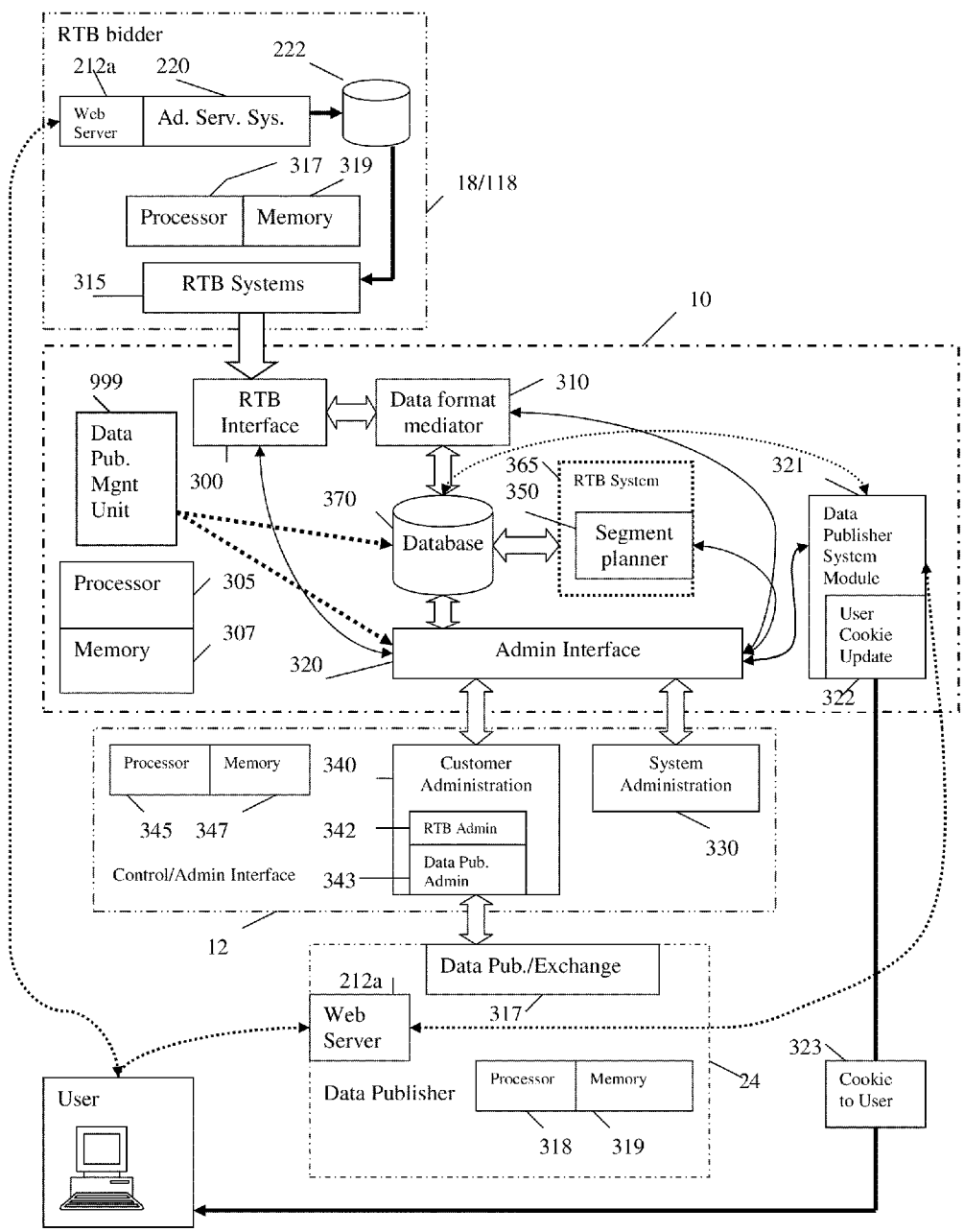
FIG. 8 depicts an embodiment of the exchange system with a data publishers (data sellers) management unit as part of the exchange system.

In one embodiment, Thread V (608) may compare the entries in the divided/altered combinations table (e.g. 655), with the current behavioral segments and may update the behavioral segment combinations (and definitions) in the behavioral segments table (e.g. 610) based on the comparisons. FIG. 7E depicts one exemplary process flow for analyzing segment division/alteration possibilities (e.g., a "Thread V" 608).

In step 985, thread 608 may begin a process, e.g. a loop, to examine each of the records in the divided/altered combinations table 655. As thread 608 processes, thread 606 (e.g. Thread W) also processes. The exchange system 10 may receive further user response data within a pre-determined time period and thread 606 (Thread W) may determine a second time based on the received further user response data that a segment combination, already is a "candidate", should, again, be considered a candidate for division.

If in step 987, thread 608 determines that the combination in question had been made a "candidate" for division (e.g. a change by division was "requested") more than once (or more than a predetermined number of times) within X days (or a predetermined time period), then thread 608 may, in step 989, make changes in the behavioral segment definition table 610 for segment combination in question and also for its definitions, if needed. For example, a "candidate" segment combination may be divided after thread 608 determines the segment combination has been found by thread 606 to be a candidate for division in a pre-determined period more than a pre-determined number of times. For example, the two new segment combinations will be used and the "old" segment will be taken out of use (and e.g. archived/or deleted after a time period).

In changing the segment combination, thread 608 may create at least one new segment combination by dividing the candidate segment combination according to the additional segment parameters. To create a new, "divided" segment combination, thread 608 may replace the currently used parameter (e.g. age 20-30) with one of the additional, added parameters (e.g. age 20-25).

In one embodiment, thread 608 may, for example, deactivate (e.g. mark as inactive) the "candidate" segment combination and replace it with combinations. If segment parameters were created (rather than found as previously existing), thread 608 may add these to the segment definitions. In step 990 thread V (608) loops to step 985 and processes the next record in the divided/altered combinations table 655 (e.g., in the example above, assuming Va existed, it will be 'marked as not used' and Vb and Vb will be defined).

Using Optimized Segments/Tagging Policy

When the behavioral segments definition table 610 has been updated with optimized segments, the exchange system 10 will use these optimized segment definitions to "tag" users, e.g. through the "User Session I" process 202, described in FIGS. 2 and 4A. In one embodiment, the exchange system 10 operating as a server connected to a network, such as the internet may "tag" by writing, saving, or otherwise storing an identifier of the new segment combination on computers of a plurality of new computer users at the time each new computer user access a Web site of a data publisher 24 to identify the computers of the new computer users with the new combination. Such tagging, for example, may identify the user as being identified, connected to or associated with one of the new, optimized segment combinations. Tagging (e.g. through cookies) will make the user's optimized segment identification available to a serving system (e.g. the serving system 118 of the RTB bidder 18). For example, with the new, optimized segment identification, at least one of the new computer users, using their computer, may access the Website of a media publisher 22 and by virtue of that access receives at their computer an advertisement targeted to the new segment.

The serving system 118, e.g. of an RTB bidder 18, may then receive content requests from users who have been "tagged" with cookies that identify them for the RTB bidder 18 as belonging to an optimized segment.

Many serving systems (e.g. 118) may use an advertising serving system to execute media optimization and decide which creatives to send to users for each advertisement exposure or "advertising call".

Embodiments of the exchange system 10 can be integrated with a serving system (e.g. 118) in a way that enables the serving system's optimization engine to use the behavioral data as one of the measured variables. In one embodiment, and as described above, the behavioral segment data is written in the form of cookies (e.g. generated by the user cookie update module 322 of the exchange system 10 using segment information stored in the database 370 within memory 307 (FIG. 3) and provided to the browser programs of the users (e.g. 52, FIG. 4A) where the cookies are stored in the memory of the computer of the user (see 57 and 51, FIG. 4A). When the user accesses a Web site of a media publisher 24, the cookie information is read by the optimization engine (e.g. within the advertising serving system 220) of the serving system 118 (e.g. when the browser program 52 transfers the cookie information in a access request for the media publisher 24 Web site).

With the data written in a cookies format, the optimization engine of the serving system treats each behavioral segment as a discrete value for the behavioral measured variable. Based on the segment values the optimization engine uses the performance of each creative on each behavioral segment for the creative choosing algorithm. The serving system 118 may then run the creative or other advertisement using the updated, optimized segment information found in the user cookies. As the segment is "tuned", more and more users, for example, may be identified to a segment with a high advertising response rate. This high response rate may be detected by the serving system engines and advertising can be targeted then, but the serving system to users having the exchange system segment identifiers.

As the serving system runs advertisements to users carrying the exchange system 10 segment combinations, the exchange system 10, in one embodiment keeps receiving data (e.g. summaries or direct data of the user activities). This additional data may be used for further optimizing segment combinations, for example, following the procedure of the learning/iteration test runs. Based on these additional learning/iteration tests, the quality level value of a qualified segment can be updated. Additionally, the group of users identified with the segment can become larger.

In using the optimized segments, e.g. to "tag" users and to perform optimization runs, the exchange system 10 and the RTB bidder 18 may perform operations according to a "tagging policy". As described above, the exchange system 10 "tags" users for it clients, e.g. the RTB bidder 18 during on-going User Session I 202 processes (see FIG. 2) The client, e.g. the RTB bidder 18 also uses the tags to place advertisements. A tagging policy may be implemented to coordinate between the actions, e.g. to preserve stability of the segments. One tagging policy "rule" may be to not to use a new, optimized segment, (for example to "tag" users with the optimized segment), for a time period, e.g., 24 hours after the optimization. Other "rules" may be implemented.

The operator for the RTB bidder 18 system or the exchange system 10 operator may analyze user responses generated from the advertisements placed, to review the "tagging policy" that may be in place. The operator for the RTB bidder 18 system or the operator for the exchange system 10 may make changes if needed to the tagging policy being used for a particular advertising campaign. Changes by the operator of the RTB bidder 18 system may be communicated to the exchange system 10. The exchange system 10 operator may also recommend changes to the tagging policy.

In reviewing and determining a tagging policy, various aspects may be taken into consideration. The exchange system 10 in one embodiment may be set to not change existing used segments. Thus, if a segment has been actually used in placing an advertisement for an advertising campaign, that segment might not be changed. This results from the observation that there is time period between writing, saving, or otherwise storing the segment information and the usage/utilization which in some embodiments must be backwards compatible. In such a case, the exchange system may not update the segment with any new combinations, but may however, keep the new combinations (e.g. for further analysis and combining) for a defined period (which may be defined in the system parameters). With such a policy the new segments can be created but set, for example, to "not active" for user tagging.

As a second consideration, the process of reviewing and determining a tagging policy may document the nature of the segments used with a given "life time period". It is known that users may receive "cookies" having a certain "lifetime" or "expiration" date. One tagging policy might be to set the life time or expiration date for the cookies used to "tag" users, e.g. in the User Session I 202 processing. After that time period, the segment may be removed according to policy from the behavioral definition table 610 and advertising will not be placed according to this segment. From time to time also conversion of segments may be made to improve the efficiency of targeting. Running parameters may also be calculated by the exchange system based 10 on optimized data values and quality level values for each of the qualified segments.

Virtual and Non-Virtual Segments

As stated above, segments or groups (such as segment combinations) can in some embodiments also be provided to the RTB bidder 18, such as by an exchange system 18, with meaningful content for manual processing or as a "virtual" segment. When the segments are provided as virtual segments, the RTB bidder 18 knows only, for example, the identity of the segment and certain data such as its conversion ratio When "real" segments (and segment combinations) with meaningful content are provided, the RTB bidder 18 understands what parameters are making up the segments and the RTB bidder 18 can examine and further test that parameter data. "Virtual" segment combinations may appear as follows to a serving system (e.g. for an RTB bidder 18):

| Exchange System | Time | Location |
| --- | --- | --- |
| Seg 1 | Morning | east |
| Seg 2 | Noon | mid |
| Seg 3 | evening | west |
| Seg 4 | night | |

"Real" or full data segment combinations may appear as follows to a serving system (e.g. for an RTB bidder 18):

| Exchange System | Time | Location |
| --- | --- | --- |
| Seg 1 Age 0-20 | Morning | east |
| Seg 2 Age 21-40 | Noon | mid |
| Seg 3 Age 41-60 | evening | west |
| Seg 4 Age 61-120 | night | |

Virtual segments provide an advantage at times, because they can be monitored by automated processes, such as that of by embodiments of the present invention and updated automatically without intervention by a serving system, thus allowing an organization such as an RTB bidding organization to more fully automate its advertising placement process through optimized segments. In other instances, the operator of the serving system (e.g. 118) may wish to have descriptive data concerning the segments.

Management of Data Seller/Publishers: Auto Registration

The management of data publishers (data sellers), e.g. 24, FIG. 1, can also be incorporated in embodiments of the present invention. Such management of data publishers (data sellers) may be executed by a sellers/publishers management unit, which is depicted in FIG. 9 at 999.

In another embodiment the sellers/publishers management unit 999 provides an auto registration facility for data publishers 24 (data sellers) to connect to the exchange system 10 automatically. In an embodiment with such a feature, the sellers/publishers management unit 999 provides auto registration based on the following operational phases:

Registration—when a data publisher 24 (data seller) opens an account, the data publisher 24 (data seller) can receive a user name and password. The data publisher 24 (data seller) may further enter data about the data publisher 24 (data seller)'s Web properties. In one embodiment, examples of such data points include:

a. Name of his web property;
b. Type of his web property (web site, web gadget, SW program etc);
c. If its a site - all the relevant URLs;
d. Known characteristics of his users (age groups, ethnicity, . . . );
e. Text language/s for every URL; and
f. Vertical relevance of each URL In the registration phase the data publisher 24 (data seller) also enters its contact data, cooperate data and the data needed for monthly payments (payment method, bank account etc).

Tags Generation—after finalizing its registration, the data publisher 24 (data seller) enters into or uses a UI that enables that seller to generate data publisher 24 (data seller) tags (or Seller/Publisher Tag) for each of its URLs. After implementing those tags the data publisher 24 (data seller) needs to enter a tags verification UI, part of the sellers/publishers management unit 995, where data publisher 24 (data seller) follows a set of instructions that enables the sellers/publishers management unit 995 to verify that each of the tags works properly. A data publisher 24 (data seller) tag is not activated before such verification finishes successfully.

URL Qualification—Each of the URLs that have a verified Seller/Publisher Tag is set by the sellers/publishers management unit 995 to be a tested URL. In such an embodiment, all the calls of each such tested URL are logged by the sellers/publishers management unit 995 once they are designated to be a tested URL, but their data is not used, in this embodiment, for optimization and segmentation. The sellers/publishers management unit 995 may first verify, based on a set of URL measurements, that the URL functions "normally" before setting it as an Active URL. As a result of the URL Measurements sellers/publishers management unit 995 sets a URL qualification grade. To facilitate this process, the exchange operator in one embodiment defines the following data about the URL qualification grade:

MM grade to automatically set a URL as Active URL;
MM grade to set a notification to the Exchange Operator to check and decide is to set the URL as Active URL;
Grade that below it a warning is set for the URL; or
Grade that below it the URL is set a Fraud URL.

The URL Measurements are based on a variety of check points that similar to the fraud measurements. see above discussion of fraud detection for a definition of those measurements and method of setting URL qualification grade.

Active Run—Once the URL qualification tests are passed successfully the URL is set to be an active URL. From that time forward all the past and future creative events are used for the optimization and segmentation procedures. In one embodiment, the exchange operator can define for a specific URL a creative event that took place before a certain date/time that can be ignored by the optimization and segmentation procedures. As described above, the on-going fraud detection process takes place though-out the activity of each data publisher 24 (data seller) as their sites remain active URLs.

Management of Data Seller/Publishers: Payments/Billing

At the end of every month the sellers/publishers management unit 995, in another embodiment, calculates the due income to each data publisher 24 (data seller). This income is based on the payment terms that were defined for that data publisher 24 (data seller). Examples of such payment terms are, for example:

Rev Share of X % from the income on every impression that took place to a user based on that user's visit to that Data Seller's web property. If such impression took place based on more than one Data Seller, the income of that impression is divided equally between all the Data Sellers;

Min Guaranteed Income for every 1000 unique users that called one of the seller's Seller Tags.

In one embodiment, the sellers/publishers management unit 995 sets default payment terms for each data publisher 24 (data seller). Those terms can be modified, for example, by an exchange operator. The exchange operator can define a criteria for a manual verification of a data publisher 24 (data seller), and after approving such the data publisher 24 (data seller), the exchange operator can define a new set of values for notification, for example, of when to conduct the next manual verification and vise versa.

In such an embodiment, the income division between the data publishers 24 (data sellers) is based on revenue share combined from the income generated by the segments and the relative contribution of the seller to this segment in a mater of volume (number of users generated by this seller) and the segment relative part in the segment structure. For example, if virtual segment 123 is combined from 4 raw segments, the exchange system will count the ratio of generated users in the last defined period (a week for example) generated by each raw segment and calculate the portion/affect of the specific seller in the revenue generation. based on this calculation the seller will get his share (percentage from the income generate to the exchange system)

At the end of each calendar month the sellers/publishers management unit 995 calculates the total due income per data publisher 24 (data seller), and offers that data in report. In addition, the sellers/publishers management unit 995 logs the pay side data to save all the events income that are associated to each data publisher 24 (data seller). At the end of each calendar month the sellers/publishers management unit 995 calculates the total due debt of data publisher 24 (data seller) and offers that data in report.

Management of Data Seller/Publishers: Fraud Detection

As part of an active run (the optimized run described above), the sellers/publishers management unit 995 may monitor (e.g. constantly or continually) the sellers table (650, FIG. 7) within the database 370 to identify fraud and meaningful changes in the quality of the data provided by each of the data publishers 24 (data sellers). Fraud is common and in the case of an exchange system 10, data publishers 24 (data sellers) are motivated to conduct fraudulent activity and thus increase their income.

In the embodiment employing fraud management, the sellers/publishers management unit 995 conducts a series of measurements to identify fraud indication. Based on the results of those measurements, the sellers/publishers management unit 995 sets a fraud suspicion grade value for each data publisher 24 (data seller). In one embodiment, the fraud suspicion grade holds is a value between 0 to 100 where, in such an embodiment, 0 means there is a minimum fraud suspicious for that data publisher 24 (data seller) and 100 means there is a maximum level of fraud suspicious for the data publisher 24 (data seller).

The sellers/publishers management unit 995 runs a variety of fraud measurements to set the fraud suspicion grade. Examples of some such fraud measurements include:

Rapid Volume Change—measuring changes in the volume of calls from the specific data publisher 24 (data seller).

Pages Ratio Change—measuring the level of change in the ratio of the call from the various pages or media properties of the specific data publisher 24 (data seller).

URL Definitions—specific data publisher 24 (data seller) can be defined to be limited based on URL text criteria such as only ".com" URL or a certain root URL such as—"www.url.com".

IP Duplication—measures the amount of duplicated IPs that the calls of the data publisher 24 (data seller) are coming from.

Market Comparables—measures the ratios between all available data points as compared to the market standards. Examples of such data points—ratios between the various OSs, browsers types and browsers versions, US states.

Manual Check Points—the exchange operator can need a set of check-point to be monitored by the sellers/publisher management unit 995. Those can be, for example:

Maximum call volume from any of the various pages or media properties of the specific data publisher 24 (data seller).

Maximum ratios between pairs of the various pages or media properties of the specific data publisher 24 (data seller). For example maximum percentage (%) of users that move from the landing page to any of the inner pages.

In one embodiment, the sellers/publishers management unit 995 may store or hold a table with data about the values for each fraud measurement with the table holding the parameters about each fraud measurement such as for example the following:

---

1. A Fraud Measurements Weight
2. First range of values and the correlating Fraud Suspicion Grade for the fraud measurement values.
3. Second range of values and the correlating Fraud Suspicion Grade for the fraud measurement values.
4. . . .
5. Last range of values and the correlating Fraud Suspicion Grade for the fraud measurement values.

---

Those values may be set for example manually by the exchange operator via dedicated UIs for the sellers/publishers management unit 995.

In one embodiment, the sellers/publishers management unit 995 performs fraud detection on an on-going basis. The sellers/publishers management unit 995 decides when to re-measure a specific data publisher 24 (data seller), based on the following criteria:

Sensitivity Level—manually set by the system operator;

Current Fraud Suspicion Grade—what is the current fraud suspicion grade of that data publisher 24 (data seller) where the measurement frequency increases with the increase of the fraud suspicion grade;

Historical Fraud Suspicion Grade—weight average fraud suspicion grade of that data publisher 24 (data seller) were older fraud suspicion grades are given less weight;

Amount of new data—how many new creatives events were logged for this data publisher 24 (data seller) since the last time the measurements run for it;

Revenue Level—what is the daily income level of that data publisher 24 (data seller); and Age—how many days of activity is recorded in the sellers table 630 about this data publisher 24 (data seller). Measurements are run more often to new sellers than to old ones.

After the set of test is run, the fraud suspicion grade is updated. In one embodiment, the exchange system operator defines, for example, the following data points in regards to the updated fraud suspicion grade:

---

Fraud Suspicion Grade to issue a warning;
Fraud Suspicion Grade to issue a severe warning;
Fraud Suspicion Grade to issue a severe warning and ignore all data from the data publisher 24 (data seller) until approval of the system operator.

---

In one embodiment, the exchange system operator can also run reports about fraud suspicion grade such as: 1) the fraud suspicion grade history for a specific data publisher 24 (data seller); or 2) Values of each of the measurements in the current or past measurement sessions.

ADDITIONAL EMBODIMENTS

Referring to FIG. 1 it also can be seen that embodiments of the system and method of the present invention can be used to provide and update segment data not only to RTB bidders 18, but also to other entities that are concerned with media advertising and advertisement space purchase. For example, instead of providing segments to the RTB bidders 18, an embodiment of the present invention can be arranged to provide combination or segment data The embodiments of the system and method of the present invention presented herein also have application beyond that of Internet advertising. The teachings of the present invention could also be applied to systems for purchase of advertising spaces such as print advertisements, target mail marketing and other such marketing types, or to other systems, providing messages or measuring feedback, beyond messaging. Further, beyond marketing, the teachings of the present invention can be applied to other systems, providing messages or measuring feedback, beyond messaging.

EXPLANATION OF TERMS

Advertisement or Creative—may be a single advertising unit such as an Internet banner advertisement with a specific picture or short movie that promotes a product or service. For purposes of this patent application, advertisements also include other types of advertising or "creatives", other displays provided by a serving system to a user or other computing elements by which a serving system presents or obtains data.

Serving System—may be one or more web servers that serve creatives or other advertisements to Web sites based on definitions set by a system operator. A serving system may be operated by or on behalf of an advertiser, an advertising agency or an RTB bidder, for example.

System Operator—may be a person that operates a serving system, for example configuring it and using it to run advertising campaigns.

User Data—may be data either "live" user data or data in summary form on a users' response to an advertisement. User data in summary form may show the conversion ration for the users of a given segment.

Behavioral Segment or Group—may be a group of users that can be clustered together based on one or more behavioral parameter. For example a behavioral segment can be all the users that have visited site-1 or site-2 in weekends Quality Level—may define how well the users of a specific segment responded to a specific creative or other advertisement.

Qualified Segment(s)—may define segments that have a Quality Level that as computed for a given advertisement or campaign exceeds a given level.

Exchange System—may be a system that runs on a standalone grid of one or more servers and implements a full data exchange by connecting, for example:

Data Buyers—may be entities that serve advertisements on the internet via serving systems. Those entities use segment data as provided by the exchange system to improve media monetization when they place advertisements. A data buyer, include all organizations running or using a serving system to place advertisements and could be, for example, an advertiser, an advertising agency or a RTB bidder; and Data Sellers—may be entities that have access to or otherwise collect user data that has value to the Data Buyers. In embodiments, data sellers use the exchange system to generate an income from their data. An example of a data seller can be an automobile research sites. Such a site offers data buyers data for targeting advertisements to users that are interested in specific types of new cars (SUVs, sport cars, etc).

Exchange Operator—may be a person that operates an exchange system.

Buyer Tag—may be a browser cookie stored under the buyer name on the computers of users (clients who access the Web sites of data publishers (data sellers). This information is stored by the exchange system while the user accesses the data publisher (data seller) site. With a buyer tag, for example, data concerning the users' segment affiliation user may be passed to a serving system, such as a serving system of an RTB bidder.

User ID (Identification)—may be a unique ID that is given to every user for the purpose of attributing all relevant to that user. To assure that the user privacy is kept, the User ID may not include any personal identifiable information, e.g., is anonymous.

User Parameter—may be a specific data point about a specific user that relates to his or her Web activity, computer, location etc. A non-exclusive list of examples of user parameters are:

Demographic data such as age and gender;

Visited site category such as travel or finance;

Visited site or site section such as cars.com or cars.com/SUVs;

Activity day-type (weekday, weekend . . . ) or time-type (morning, noon . . . );

OS such as MS or Apple.

Parameter Value—may be a value that is set for a certain user parameter. For example for the user parameter "OS", the parameter value can be "MS" or "Apple".

Creative Event or User Event—may be a data point about a specific creative or other advertisement that can be, for example:

Impression (or Exposure)—may define a physical exposure of the creative to an end user on a certain site of other web property;

Action—An action may describe any action that a user that saw the creative executed on the site. Examples of Actions include, for example, a "click" by a user (e.g. using a mouse), filling a web form, completing an e-commerce transaction etc.

Buyer's Record—may be user response data passed from the serving system (e.g. through a summary statistical report), for example to an exchange system, which may provide data concerning one or more user response events or actions associated to a specific creative or other advertisement. For example, a buyer's record holds data reported by a data buyer (such as an RTB bidder) which for example is stored in the buyer record table (for "qualified combinations" used by thread I . . . II and IV).

Buyer Report Table—may be a sorted data-base table that holds the user response data sent from a data buyer such as an RTB bidder of an exchange system. Segment—as used herein may be a data structure, e.g. on a computer, which holds attributes or parameters used to characterize groups of people, e.g. a sub-set or portion of a larger group, Each member that was identified as being part of the segment holds an identifier to this segment. The data structure used for forming segment combinations may not hold any particular reference to individual members, but may hold aggregate information, such as, for example, how many members (percentage of users) belong to this group.

Segment Definition—as used herein may be a data structure, e.g. on a computer, which sets attributes and parameters (or sub-segments) that identify the nature, properties or meanings of the segment (for example—"frequency of reading news", "Origin country", "gender").

Segment Combination—may be segment definitions (or segments) combined together in data structures, e.g. on a computer. A "segment combination" may hold the identifications or descriptions of people (e.g. computer users) that belong to more than one segment. For example a segment for people who "read news every 3 hours or more" and a segment for people who "like fictional books" can be combined into a segment combination (The relation in combination can be "and" or "or"). Segment combinations can also be referred to herein as segments.

Sub Segment—as used herein may be a data structure (e.g. stored on a computer) that identifies or describes a sub group, part of the group that belongs to a certain segment. For example—"people who get updated with news with frequency of 2 days or more").

Behavioral segment—segment whose definition deals with people's behavior and not objective criteria (for example, "tendency to read news", "common working hours" comparing to "age" or "origin country" or "gender").

Behavioral Segment—as used herein may be a segment definition (herein a data structure, implemented on a computer), having definitional attributes that pertain to or describe subjective aspects of people's behavior such as for example, "tendency to read news", "common working hours" when comparing such aspects to other aspects such as "age" or "origin country" or "gender".

Behavioral Segment Combinations—may be a behavioral segment combined into further data structures (e.g. on a computer) with either non-behavioral segments or other behavioral segments.

Segmentation—may be the on-going process of updating the definitions of the various segments (for example, behavioral segments).

Segmentation Engine or Segment Planner—may be the systems or processes that execute the segmentation process.

Optimized Event—may be which of the creative events that is desired to be optimized. If, for example, the optimized event is clicks, then the exchange system can look for the behavioral segments that generate the given minimum CTR level and direct the creative to those segments.

Qualified Combination—may be a sub-set of records from the buyers report table that was found as suitable for processing (for example—the minimum number of users that were exposed to the content was larger than "XXX").

Predictive Lift—may be the average response rate that a qualified combination or other segment has, divided by a factor such as, for example, global average response rate.

CTR—may be the percentage of those users clicking on a link out of the total number who viewed the link or text ad. A CTR level may be a percentage used as a reference value.

CONCLUSION

Each of the various embodiments discussed herein may be combined, and features or each of the embodiments herein may be combined or used in various combinations. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of improving segment combinations comprising information characterizing behaviors of groups of users of computers in a computer network, the method comprising:

receiving, at a computer server, user response data concerning an advertisement exposed to a first plurality of computer users operating computers connected to the computer network, the identities of the computers of the users being identified with a segment combination based on the computers' previous accessing of a data publisher Website, the user response data providing a user response rate value indicative the responsiveness of the users of the computers to the advertisement;

identifying from the user response data, those segment combinations within the user response data that have a user response rate surpassing a pre-determined value measured according to one or more user events;

determining, for each permutation of permutations of the identified segment combinations, associated values indicative of statistical unification based on lift variations of the identified segment combinations;

creating at least one segment combination as a new combination from the permutations of the identified segment combinations, wherein the resulting new combination has an associated value indicative of statistical unification that surpasses a threshold value and provides an indication of the behavioral similarity of the combined group in response to the advertisement; and writing an identifier of the new segment combination, using a computer server connected to the network, on computers of a second plurality of computer users at the time each second plurality computer user access a Web site of a data publisher to identify the computers of the second plurality users with the new combination, where the new segment combination is written to the computers to be accessible and identifiable to a serving system of an advertisement placement organization.

2. The method of claim 1 comprising providing to a new computer user, who using a computer, accesses the Website of a media publisher, an advertisement targeted to the new segment.

3. The method of claim 1, wherein the user response data comprises a group size value indicating the number of users with the segment exposed to the advertisement.

4. The method of claim 1, wherein the user response data comprises a value indicating the percentage of users who responded to the advertisement.

5. The method of claim 1, wherein users are associated with segment combinations by receiving at a computer cookies that identify the segment.

6. The method of claim 1, wherein the users are associated with segment combinations by receiving at a computer virtual segments.

7. The method of claim 1, wherein the user's association with segment combinations is triggered by the user's access to a Web site of a data publisher and wherein the associating comprises writing cookies to a browser program operated by each user wherein the cookies identify the segment combination.

8. A system for improving segment combinations comprising information characterizing behaviors of groups of users of computers in a computer network, the system comprising:

a computer server connected to the network to receive user response data concerning an advertisement exposed to a first plurality of computer users operating computers connected to the computer network, the identities of the computers of the users being identified with a segment combination based on the computers' previous accessing of a data publisher Website, the user response data providing a user response rate value indicative the responsiveness of the users of the computers to the advertisement;

the server identifying from the user response data, those segment combinations within the user response data that have a user response rate surpassing a pre-determined value measured according to one or more user events;

the server determining, for each permutation of permutations of the identified segment combinations, associated values indicative of statistical unification based on lift variations of the identified segment combinations;

the server creating at least one segment combination as a new combination from the permutations of the identified segment combinations, wherein the resulting new combination has an associated value indicative of statistical unification that surpasses a threshold value and provides an indication of the behavioral similarity of the combined group in response to the advertisement; and the server writing an identifier of the new segment combination, using a computer server connected to the network, on computers of a second plurality of computer users at the time each second plurality computer user access a Web site of a data publisher to identify the computers of the second plurality users with the new combination, where the new segment combination is written to the computers to be accessible and identifiable to a serving system of an advertisement placement organization.

9. The system of claim 8, wherein the server is to provide to a new computer user, who using said computer, accesses the Website of a media publisher, an advertisement targeted to the new segment.

10. The system of claim 8, wherein the user response data comprises a group size value showing the number of users with the segment exposed to the advertisement.

11. The system of claim 8, wherein the user response data comprises a value showing the percentage of users who responded to the advertisement.

12. The system of claim 8, wherein users are associated with segment combinations by receiving cookies that identify the segment.

* * * * *